(12) United States Patent
Kamura et al.

(10) Patent No.: US 11,002,991 B2
(45) Date of Patent: May 11, 2021

(54) SPECTACLE LENS AND SPECTACLES

(71) Applicant: HOYA LENS THAILAND LTD., Pathumthani (TH)

(72) Inventors: Hitoshi Kamura, Tokyo (JP); Yoichi Ogo, Tokyo (JP); Yoshitaka Matsui, Tokyo (JP); Kenji Takashiba, Pathumthani (TH)

(73) Assignee: HOYA LENS THAILAND LTD., Pathumthani (TH)

( * ) Notice: Subject to any disclaimer, the term of this patent is extended or adjusted under 35 U.S.C. 154(b) by 71 days.

(21) Appl. No.: 16/018,785

(22) Filed: Jun. 26, 2018

(65) Prior Publication Data

US 2018/0373062 A1 Dec. 27, 2018

Related U.S. Application Data

(63) Continuation of application No. PCT/JP2017/013803, filed on Mar. 31, 2017.

(30) Foreign Application Priority Data

Mar. 31, 2016 (JP) .............................. JP2016-072764

(51) Int. Cl.
*G02C 7/10* (2006.01)
*G02C 7/02* (2006.01)
(Continued)

(52) U.S. Cl.
CPC .................. *G02C 7/10* (2013.01); *B32B 7/02* (2013.01); *G02B 5/223* (2013.01); *G02B 5/26* (2013.01);
(Continued)

(58) Field of Classification Search
CPC ........... G02C 7/10; G02C 7/104; G02C 7/107
(Continued)

(56) References Cited

U.S. PATENT DOCUMENTS

2007/0055369 A1* 3/2007 Grubbs ..................... A61F 2/16
623/6.6
2015/0198821 A1 7/2015 Miyamoto et al.
(Continued)

FOREIGN PATENT DOCUMENTS

CN 104327230 A 2/2015
EP 2 081 612 A2 7/2009
(Continued)

OTHER PUBLICATIONS

Jun. 20, 2017 International Search Report issued in International Patent Application PCT/JP2017/013803.
(Continued)

*Primary Examiner* — Darryl J Collins
(74) *Attorney, Agent, or Firm* — Oliff PLC

(57) ABSTRACT

Provided is a spectacle lens including a lens substrate, a multilayer film located on an object-side surface of the lens substrate, and a multilayer film located on an eyeball-side surface of the lens substrate, wherein a blue light absorption rate is 10.0% or higher, the lens substrate includes a blue-light-absorbing compound, and an average reflectance in a wavelength range of 400 nm to 500 nm measured on each of the object-side surface and the eyeball-side surface of the spectacle lens is in a range of 10.0% to 20.0%, and a luminous reflectance measured on each of the object-side surface and the eyeball-side surface of the spectacle lens is less than 2.0%.

11 Claims, 7 Drawing Sheets

(51) Int. Cl.
*G02B 5/22* (2006.01)
*G02B 5/28* (2006.01)
*B32B 7/02* (2019.01)
*G02B 5/26* (2006.01)

(52) U.S. Cl.
CPC ............ *G02B 5/283* (2013.01); *G02B 5/285* (2013.01); *G02C 7/104* (2013.01); *G02C 7/107* (2013.01); *G02C 7/108* (2013.01)

(58) Field of Classification Search
USPC .............. 351/159.49, 159.59, 159.6, 159.62, 351/159.65
See application file for complete search history.

(56) References Cited

U.S. PATENT DOCUMENTS

| | | | |
|---|---|---|---|
| 2015/0234208 A1 | 8/2015 | De Ayguavives et al. | |
| 2016/0349537 A1* | 12/2016 | Wu | G02C 7/10 |
| 2017/0097521 A1* | 4/2017 | Yoshida | G02C 7/107 |

FOREIGN PATENT DOCUMENTS

| | | | |
|---|---|---|---|
| EP | 2 887 129 A1 | 6/2015 | |
| JP | H09-265059 A | 10/1997 | |
| JP | 2010-507108 A | 3/2010 | |
| JP | 2012-173704 A | 9/2012 | |
| JP | 2013-008052 A | 1/2013 | |
| JP | 2013-238634 A | 11/2013 | |
| JP | 2014-199327 A | 10/2014 | |
| JP | 2015-117948 A | 6/2015 | |
| JP | 2015-118122 A | 6/2015 | |
| JP | 2015-135495 A | 7/2015 | |
| JP | 2015-203856 A | 11/2015 | |
| WO | 2007-146933 A2 | 12/2007 | |
| WO | 2008/048880 A2 | 4/2008 | |
| WO | 2014/103921 A1 | 7/2014 | |
| WO | 2015/046540 A1 | 4/2015 | |
| WO | 2016/143899 A1 | 9/2016 | |

OTHER PUBLICATIONS

Jun. 20, 2017 Written Opinion issued in International Patent Application PCT/JP2017/013803.
Aug. 14, 2019 Office Action issued in Chinese Patent Application No. 201780005136.3.
Oct. 8, 2019 Office Action issued in Japanese Patent Application No. 2018-509701.
Oct. 11, 2019 Extended Search Report issued in European Patent Application No. 17775606.1.
May 30, 2019 Office Action issued in Korean Patent Application No. 10-2018-7018017.
Jun. 18, 2019 Office Action issued in Japanese Patent Application No. 2018-509701.
Feb. 25, 2019 Office Action issued in Chinese Patent Application No. 201780005136.3.
Apr. 28, 2020 Office Action issued in Japanese Patent Application No. 2018-509701.
Dec. 19, 2020 Office Action issued in Korean Patent Application No. 10-2018-7018017.
Jan. 9, 2020 Office Action issued in Chinese Patent Application No. 201780005136.3.
Mar. 4, 2021 Office Action issued in European Patent Application No. 17775606.1.
Mar. 23, 2021 Office Action issued in Japanese Patent Application No. 2018-509701.

* cited by examiner

SPECTACLE LENS AND SPECTACLES

CROSS-REFERENCE TO RELATED APPLICATION

This application is a Continuation of PCT International Application No. PCT/JP2017/13803 filed on Mar. 31, 2017, which was published under PCT Article 21 (2) in Japanese and claims priority under 35 U.S.C § 119 (a) to Japanese Patent Application No. 2016-72764 filed on Mar. 31, 2016. The above applications are hereby expressly incorporated by reference, in their entirety, into the present application.

TECHNICAL FIELD

The present disclosure relates to a spectacle lens and spectacles equipped with the spectacle lens.

BACKGROUND ART

In recent years, cathode ray tube monitor screens of digital devices have been replaced by liquid crystals, and recently LED liquid crystals have become widespread. However, liquid crystal monitors, especially LED liquid crystal monitors, strongly emit short-wavelength light called blue light. Therefore, in order to effectively reduce eyestrain and eye pain caused when using a digital device for a long time, measures should be taken to reduce the burden on the eyes caused by blue light. Generally, light in the wavelength range of 400 nm to 500 nm or light in the vicinity of this wavelength range is called blue light.

Regarding the above points, for example, Japanese Patent Application Publication No. 2013-8052 suggests an optical article having a multilayer film having a property of reflecting light with a wavelength of 400 nm to 450 nm on the convex surface and concave surface of a plastic substrate.

SUMMARY

As a means for reducing the burden on the eyes caused by blue light, a multilayer film having a property of reflecting blue light can be provided on both sides of a lens substrate as disclosed in Japanese Patent Application Publication No. 2013-8052.

Meanwhile, good wearing feeling is desired for a wearer using the spectacles, and good appearance is desired for spectacle lenses. However, as the reflectance of blue light on both sides of the spectacle lens is increased, although the amount of blue light incident on the eyes of the wearer via the spectacle lens can be reduced, the wearing feeling and appearance of the spectacle lens tend to deteriorate.

According to one aspect of the present disclosure, there is provided a spectacle lens that can reduce the burden on the eye caused by blue light and has good wearing feeling and good appearance.

One aspect of the present disclosure relates to a spectacle lens including: a lens substrate; a multilayer film located on an object-side surface of the lens substrate; and a multilayer film located on an eyeball-side surface of the lens substrate, wherein a blue light absorption rate is 10.0% or higher, the lens substrate includes a blue-light-absorbing compound, and an average reflectance in a wavelength range of 400 nm to 500 nm measured on each of the object-side surface and the eyeball-side surface of the spectacle lens is in a range of 10.0% to 20.0%, and a luminous reflectance measured on each of the object-side surface and the eyeball-side surface of the spectacle lens is less than 2.0%.

The inventors of the present disclosure have conducted comprehensive research to achieve the abovementioned object, and as a result, have found a new spectacle lens according to the abovementioned aspect of the present disclosure.

The spectacle lens has a multilayer film on each of the object-side surface and the eyeball-side surface of the lens substrate. That is, the spectacle lens has a multilayer film on both sides of the spectacle lens. An average reflectance (hereinafter also referred to as "blue light reflectance") in a wavelength range of 400 nm to 500 nm measured on the object-side surface and the eyeball-side surface of the spectacle lens is 10.0% to 20.0%. As a result, the spectacle lens can reflect blue light with a high reflectance on both sides thereof. However, in the related art, where an attempt is made to achieve a high blue light reflectance by providing a multilayer film on both sides of a spectacle lens, the resulting spectacle lens tends to be inferior in wearing feeling and appearance. This is due to the occurrence of a double image called "ghost" and the occurrence of glare on both sides of the spectacle lens.

Meanwhile, in the abovementioned spectacle lens, the lens substrate includes a blue-light-absorbing compound and the blue light absorption rate of the spectacle lens is 10.0% or more. This makes it possible to suppress the occurrence of ghosts. Details will be described hereinbelow.

With respect to wearing feeling and appearance, the occurrence of glare on the object-side surface of the spectacle lens causes degradation of appearance quality of the spectacle lens. This is because the appearance of the spectacle wearer causes an uncomfortable feeling (unnatural reflection) in a third person facing the spectacle wearer. In addition, the occurrence of glare on the eyeball-side surface of the spectacle lens causes degradation of wearing feeling sensed by the spectacle wearer (the spectacle wearer feels unnatural reflection). By contrast, although the abovementioned spectacle lens has a high blue light reflectance on both sides of the spectacle lens, the luminous reflectance measured on both sides is less than 2.0%. This makes it possible to suppress glare on the object-side surface of the spectacle lens and also glare on the eyeball-side surface.

Another aspect of the present disclosure relates to spectacles having the spectacle lens, and a frame in which the spectacle lens is mounted.

According to one aspect of the present disclosure, it is possible to provide a spectacle lens that can reduce the burden on the eyes caused by blue light and has good wearing feeling and good appearance, and spectacles provided with the spectacle lens.

DESCRIPTION OF EMBODIMENTS

[Spectacle Lens]

Figure 1:
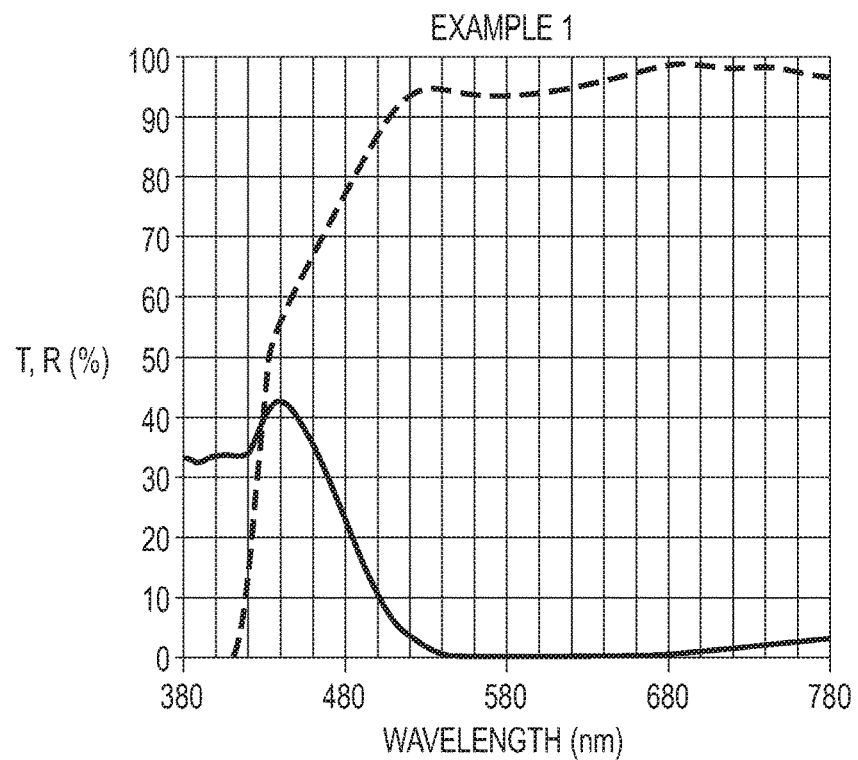
FIG. 1 shows a reflection spectrum and a transmission spectrum of the spectacle lens of Example 1.

A spectacle lens according to one aspect of the present disclosure includes a lens substrate, a multilayer film located on an object-side surface of the lens substrate, and a multilayer film located on an eyeball-side surface of the lens substrate, wherein a blue light absorption rate is 10.0% or higher, the lens substrate includes a blue-light-absorbing compound, the average reflectance in a wavelength range of 400 nm to 500 nm measured on each of the object-side surface and the eyeball-side surface of the spectacle lens is in a range of 10.0% to 20.00, and the luminous reflectance measured on each of the object-side surface and the eyeball-side surface of the spectacle lens is less than 2.0%.

Definitions of terms and/or measurement methods of the present disclosure and present description are explained hereinbelow.

The "object-side surface", as referred to herein, is a surface located on the object side when spectacles with the spectacle lens are worn by the wearer, and the "eyeball-side surface", as referred to herein, is a surface on the opposite side, that is, a surface located on the eyeball side when spectacles with the spectacle lens are worn by the wearer.

The "blue light absorption rate" refers to a spectacle lens and can be determined by the following method.

The transmittance and reflectance in the wavelength range of 380 nm to 500 nm are measured by a spectrophotometer. In the present disclosure and the present description, measurement light for determining reflection, transmission or absorption is assumed to be direct incident light. Therefore, the transmittance and reflectance are the transmittance and reflectance for the direct incident light. Further, the measurements are performed at the optical center. Unless otherwise specified, the measurement wavelength interval (pitch) can be arbitrarily set for the measurements. For example, the pitch can be arbitrarily set within a range of 1 nm to 5 nm. For the transmittance measured by the spectrophotometer, a component reflected on the surface of the spectacle lens in the incident light is not taken into account. Therefore, similarly to the light absorbed by the spectacle lens, the light reflected on the spectacle lens surface and not entering the lens is also observed as a decrease in the transmission amount in the measurement by the spectrophotometer. Therefore, the transmittance $\tau^*(\lambda)$ at a wavelength $\lambda$ nm obtained by subtracting the effect of reflection is calculated by the following Equation 1.

$$\tau^*(\lambda) = \frac{\tau(\lambda)}{1 - R(\lambda)} \quad \text{(Equation 1)}$$

(In Equation 1, $\tau(\lambda)$ is the transmittance at a wavelength $\lambda$ nm measured by a spectrophotometer and $R(\lambda)$ is the reflectance at a wavelength $\lambda$ nm measured by a spectrophotometer.)

Using the calculated transmittance $\tau^*(\lambda)$, the blue light absorption rate $a_b$ of the spectacle lens is calculated by the following Equation 2.

$$a_b = 1 - \frac{\int_{380\,nm}^{500\,nm} \tau^*(\lambda) \cdot WB(\lambda) \cdot d\lambda}{\int_{380\,nm}^{500\,nm} WB(\lambda) \cdot d\lambda} \quad \text{(Equation 2)}$$

In Equation 2, $WB(\lambda)$ is a weighting function and is calculated by the following Equation 3. In Equation 3, $E_{s\lambda}(\lambda)$ is the spectral irradiance of sunlight, and $B(\lambda)$ is a blue light hazard function. $E_{s\lambda}(\lambda)$, $B(\lambda)$ and $WB(\lambda)$ are described in Annex C of JIS T 7333. When calculating values using $E_{s\lambda}(\lambda)$, $B(\lambda)$ and $WB(\lambda)$, the measurement with a spectrophotometer is to be performed at least from 380 nm to 500 nm, at a pitch of 5 nm, that is, at 380 nm, 385 nm, 390 nm . . . to 500 nm. The blue light absorption rate $a_b$ of the spectacle lens is determined by the above equation by using the values thus measured with a 5-nm pitch.

$$WB(\lambda) = E_{s\lambda}(\lambda) \cdot B(\lambda) \quad \text{(Equation 3)}$$

The "blue-light-absorbing compound", as referred to herein, means a compound having absorption in the wavelength range of 400 nm to 500 nm.

The average reflectance in the wavelength range of 400 nm to 500 nm measured on the object-side surface of the spectacle lens and the average reflectance in the wavelength range of 400 nm to 500 nm measured on the eyeball-side surface of the spectacle lens are an arithmetic average of the reflectance measured in the wavelength range of 400 nm to 500 nm using a spectrophotometer on each surface. For the measurement, the measurement wavelength interval (pitch) can be arbitrarily set. For example, the pitch can be arbitrarily set within a range of 1 nm to 5 nm.

The "luminous reflectance", as referred to herein, is measured in accordance with JIS T 7334:2011, and the "luminous transmittance" described hereinbelow is measured in accordance with JIS T 7333:2005.

The "blue light cut rate" described later is obtained by the following Equation 4.

Blue light cut rate $C_b = 1 - \tau_b$ (Equation 4)

In Equation 4, $\tau_b$ is the weighted transmittance of blue light harmful to eyes prescribed by the standards of the Japan Medical-Optical Equipment Industrial Association, and is calculated by the following Equation 5. In Equation 5, $WB(\lambda)$ is calculated by Equation 3 above. $\tau(\lambda)$ is the transmittance at the wavelength $\lambda$ nm measured by a spectrophotometer. Therefore, the cut rate of blue light by absorption and the cut rate of blue light by reflection are added up in the blue light cut rate $C_b$.

$$\tau_b = \frac{\int_{380\,nm}^{500\,nm} \tau(\lambda) \cdot WB(\lambda) \cdot d\lambda}{\int_{380\,nm}^{500\,nm} WB(\lambda) \cdot d\lambda} \quad \text{(Equation 5)}$$

The spectacle lens will be described hereinbelow in greater detail.

<Reflection Characteristics>

(Average Reflectance (Blue Light Reflectance) in the Wavelength Range of 400 nm to 500 nm)

The spectacle lens has an average reflectance in the wavelength range of 400 nm to 500 nm measured on the object-side surface of the spectacle lens in the range of 10.0% to 20.0% and has an average reflectance in the wavelength range of 400 nm to 500 nm measured on the eyeball-side surface of the spectacle lens in the range of 10.0% to 20.0%. With the spectacle lens having the blue light reflectance of 10.0% or more on both sides of the spectacle lens, the effect of the blue light on the eyes can be effectively reduced. However, in the conventional spectacle lens, where an attempt is made to achieve a high blue light reflectance on both sides of a spectacle lens, the resulting spectacle lens tends to be inferior in wearing feeling and appearance. By contrast, in the abovementioned spectacle lens, the blue light reflectance is as high as 10.0% to 20.0% on each side of the spectacle lens and good wearing feeling and appearance can be realized. The reasons why a combination of high blue light reflectance and good wearing feeling and appearance can be realized will be described hereinbelow in detail.

In one embodiment, from the viewpoint of further reducing the effect of blue light on the eyes, it is possible that the average reflectance in the wavelength range of 400 nm to 500 nm measured on the object-side surface of the spectacle lens be more than 10.0%, 11.0% or more, more than 11.0%, 12.0% or more, more than 12.0%, 13.0% or more, 14.0% or more, or 15.0% or more.

In one embodiment, from the viewpoint of further reducing the effect of blue light on the eyes, it is possible that the average reflectance in the wavelength range of 400 nm to 500 nm measured on the eyeball-side surface of the spectacle lens be more than 10.0%, 11.0% or more, more than 11.0%, 12.0% or more, more than 12.0%, 13.0% or more, 14.0% or more, or 15.0% or more.

Meanwhile, in order to realize a good wearing feeling, in the spectacle lens, the average reflectance in the wavelength range of 400 nm to 500 nm measured on the object-side surface of the spectacle lens is 20.0% or less, and the average reflectance in the wavelength range of 400 nm to 500 nm measured on the eyeball-side surface of the spectacle lens is also 20.0% or less. In one embodiment, from the viewpoint of realizing a better wearing feeling, in the spectacle lens, the average reflectance in the wavelength range of 400 nm to 500 nm measured on the object-side surface of the spectacle lens may be 19.5% or less, 19.0% or less, 18.0% or less, 17.5% or less, 17.0% or less, 16.0% or less, 15.0% or less, or 14.0% or less. In one embodiment, from the viewpoint of realizing a better wearing feeling, the average reflectance in the wavelength range of 400 nm to 500 nm measured on the eyeball-side surface of the spectacle lens may be 19.5% or less, 19.0% or less, 18.0% or less, 17.5% or less, 17.0% or less, 16.0% or less, 15.0% or less, or 14.0% or less.

The average reflectance in the wavelength range of 400 nm to 500 nm measured on the object-side surface of the spectacle lens and the average reflectance in the wavelength range of 400 nm to 500 nm measured on the eyeball-side surface may have the same value or different values. When the values are different, the average reflectance in the wavelength range of 400 nm to 500 nm measured on the object-side surface of the spectacle lens may be larger or smaller than the average reflectance in the wavelength range of 400 nm to 500 nm measured on the eyeball-side surface.

(Luminous Reflectance)

The spectacle lens exhibits a high blue light reflectance on both sides of the spectacle lens. Thus, the effect of blue light on the eye can be effectively reduced. The inventors of the present disclosure have conducted additional research of this issue and have found that in the conventional multilayer film design, as the blue light reflectance is increased, the glare which causes deterioration of wearing feeling and appearance quality becomes conspicuous apparently because of the increase in reflectance of the so-called green light which is in the wavelength range adjacent on the long wavelength side to the wavelength range of the blue light. Further, by performing a film design which is different from the conventional one and which suppresses the increase in the reflectance of green light in the range of the blue light reflectance of 10.0% to 20.0% it is possible to suppress the luminous reflectance to a low level. Thus it is possible to suppress both the occurrence of glare on the object-side surface showing the blue light reflectance in the range of 10.0% to 20.0% and the occurrence of glare on the eyeball-side surface showing the blue light reflectance in the range of 10.0% to 20.0%. Thus, with the spectacle lens, by suppressing the occurrence of glare which causes deterioration of wearing feeling and appearance quality in this way, it is possible to effectively reduce the burden on the eyes due to the blue light, and to improve the wearing feeling and appearance.

From the viewpoint of further suppressing the glare on the object-side surface leading to deterioration of appearance quality, the luminous reflectance measured on the object-side surface of the spectacle lens may be 1.8% or less, more 1.5% or less, or 1.3% or less. Meanwhile, from the viewpoint of further suppression of glare on the eyeball-side surface leading to degradation of wearing feeling, the luminous reflectance measured on the eyeball-side surface of the spectacle lens may be 1.8% or less, 1.5% or less, or 1.3% or less.

The luminous reflectance measured on the object-side surface of the spectacle lens and the luminous reflectance measured on the eyeball-side surface can be, for example, 0.1% or more, 0.2% or more, 0.3% or more, 0.4% or more, or 0.5% or more, but the above values are illustrative and are not limiting.

<Blue Light Absorption Rate of Spectacle Lens>

The spectacle lens has the reflection characteristics described above and a blue light absorption rate of 10.0% or more. By having a high blue light reflectance on both sides of the spectacle lens and a blue light of the spectacle lens of 10.0% or more, the occurrence of a double image called ghost can be suppressed. Meanwhile, where the blue light reflectance is simply increased on both sides of the spectacle lens, the wearing feeling degrades due to the occurrence of ghosts.

The main cause of the occurrence of ghosts is that the blue light incident on the lens without being reflected by the object-side surface of the spectacle lens undergoes multiple reflections between the eyeball-side surface and object-side surfaces having a high blue light reflectance inside the spectacle lens. By contrast, when the blue light absorption rate of the spectacle lens is 10.0% or more, it is possible to suppress the occurrence of ghosts in the spectacle lens with enhanced blue light reflectance on both sides. This is apparently because the blue light that undergoes multiple reflections is significantly absorbed inside the spectacle lens, which makes it possible to lower the intensity with which a double image formed by multiple reflections is visually recognized, or to lower the intensity so that the double image is not visually recognized. From the viewpoint of further suppressing the occurrence of ghosts, the blue light absorption rate of the spectacle lens may be 12.0% or more, 13.0% or more, 14.0% or more, 15.0% or more, or 15.5% or more. Further, the blue light absorption rate of the spectacle lens can be, for example, 40.0% or less, 30.0% or less, 28.0% or less, or 25.0% or less, but these values are merely illustrative. From the viewpoint of further suppressing the occurrence of ghosts, the higher the blue light absorption rate of the spectacle lens, the better. Therefore, the blue light absorption rate may exceed the above exemplified value.

In the spectacle lens, a lens substrate includes a blue-light-absorbing compound. This contributes to the fact that the spectacle lens shows a high blue light absorption rate of 10.0% or more. Details of the blue-light-absorbing compound will be described hereinbelow.

Next, the multilayer film, the lens substrate, and the like included in the spectacle lens will be described in greater detail.

<Multilayer Film>

The spectacle lens includes a multilayer film located on an object-side surface of the lens substrate and a multilayer film located on an eyeball-side surface of the lens substrate. The multilayer film may be located directly on the surface of the lens substrate or may be located indirectly on the surface of the lens substrate with one or more other layers being interposed therebetween. Examples of the layers that can be formed between the lens substrate and the multilayer film include a polarizing layer, a dimming layer, a hard coat layer (hereinafter also referred to as "hard coat"), and the like. By providing the hard coat layer, the durability (strength) of the spectacle lens can also be increased. For details of the hard coat layer, refer, for example, to paragraphs 0025 to 0028 and 0030 of Japanese Patent Application Publication No. 2012-128135. Further, a primer layer for improving adhesion may be formed between the lens substrate and the multilayer film. For details of the primer layer, refer, for example, to paragraphs 0029 and 0030 of Japanese Patent Application Publication No. 2012-128135.

The multilayer films respectively provided on the eyeball-side surface and the object-side surface of the lens substrate are not particularly limited as long as they can impart the reflection characteristics described above to the surfaces of the spectacle lens having these multilayer films. Such a multilayer film can be formed by sequentially laminating a high refractive index layer and a low refractive index layer. More specifically, the multilayer film can be formed by determining the film thickness of each layer by optical simulation by a known method on the basis of the refractive index of the film material for forming the high refractive index layer and the low refractive index layer and the reflection characteristic (blue light reflectance and luminous reflectance) to be imparted to the spectacle lens by providing the multilayer film, and successively laminating the high refractive index layer and the low refractive index layer under the film formation conditions established so as to obtain the determined film thickness. As described above, by designing the film so as to increase the reflectance of blue light and suppresses an increase in reflectance of green light in a wavelength range (for example, a wavelength range of more than 500 nm to 580 nm or less) adjacent to the wavelength range of blue light, it is possible to provide each surface of the spectacle lens with a blue light reflectance in the range of 10.0 nm to 20.0 nm and a luminous reflectance of less than 2.0%. The film-forming material may be an inorganic material, an organic material, or an organic-inorganic composite material, and from the viewpoints of film formation and availability, the film-forming material may be an inorganic material. The blue light reflectance and the luminous reflectance can be controlled by adjusting the kind of the film forming material, the film thickness, the order of layering, and the like.

The high refractive index material for forming the high refractive index layer can be exemplified by an oxide selected from the group consisting of zirconium oxide (for example, $ZrO_2$), tantalum oxide ($Ta_2O_5$), titanium oxide (for example, $TiO_2$), aluminum oxide ($Al_2O_3$), yttrium oxide (for example, $Y_2O_3$), hafnium oxide (for example, $HfO_2$), and niobium oxide (for example, $Nb_2O_5$), and mixtures of two or more thereof. Meanwhile, the low refractive index material for forming the low refractive index layer can be exemplified by an oxide or a fluoride selected from the group consisting of silicon oxide (for example, $SiO_2$), magnesium fluoride (for example, $MgF_2$) and barium fluoride (for example, $BaF_2$), and mixtures of two or more thereof. In the above examples, oxides and fluorides are expressed by stoichiometric composition for convenience, but those having an amount of oxygen or fluorine which is deficient or excessive with respect to the stoichiometric composition can also be used as the high refractive index materials or low refractive index materials.

The film thickness of each layer included in the multilayer film can be determined by optical simulation as described above. The layer configuration of the multilayer film, for example, from the lens substrate side toward the lens outermost surface side, can be exemplified by:

a configuration in which layering is performed in the order of the first layer (low refractive index layer)/second layer (high refractive index layer)/third layer (low refractive index layer)/fourth layer (high refractive index layer)/fifth layer (low refractive index layer)/sixth layer (high refractive index layer)/seventh layer (low refractive index layer);

a configuration in which layering is performed in the order of the first layer (high refractive index layer)/second layer (low refractive index layer)/third layer (high refractive index layer)/fourth layer (low refractive index layer)/fifth layer (high refractive index layer)/sixth layer (low refractive index layer); and a configuration in which layering is performed in the order of the first layer (low refractive index layer)/second layer (high refractive index layer)/third layer (low refractive index layer)/fourth layer (high refractive index layer)/fifth layer (low refractive index layer).

A combination of low refractive index layer and high refractive index layer can be exemplified by a combination of a coating film including silicon oxide as a main component (low refractive index layer) and a coating film mainly composed of zirconium oxide (high refractive index layer). Another example is a combination of a coating film including silicon oxide as a main component (low refractive index layer) and a coating film including niobium oxide as a main component (high refractive index layer). A multilayer film including at least one layered structure having two layers of the above combination adjacent to each other is an example of the multilayer film.

Each of the above layers may be a coating film including the above-mentioned high refractive index material or low refractive index material as a main component. Here, the main component is a component which is contained in the largest amount in the coating film, and is usually a component taking about 50% by mass to 100% by mass, or about 90% by mass to 100% by mass of the whole. Such a coating film can be formed by performing film formation using a film-forming material (for example, vapor deposition source) including the above-mentioned material as a main component. The main component relating to the film forming material is also the same as described above. A small amount of unavoidably mixed impurities may be contained in the coating film and the film forming material, and other components such as other inorganic substances and well-known additional components playing a role of assisting the film formation may be contained within ranges in which the function of the main component is not impaired. The film can be formed by a known film formation method, and from the viewpoint of ease of film formation, vapor deposition can be performed. The vapor deposition in the present disclosure is inclusive of dry methods, for example, a vacuum vapor deposition method, an ion plating method, a sputtering method, and the like. In the vacuum vapor deposition method, an ion beam assist method in which an ion beam is simultaneously irradiated during vapor deposition may be used.

In addition to the high refractive index layer and the low refractive index layer described above, a coating film including a conductive oxide as a main component, or one or more conductive oxide layers formed by vapor deposition using a vapor deposition source including a conductive oxide as a main component, can be included at any position of the multilayer film. From the viewpoint of transparency of the spectacle lens, it is possible that various conductive oxides which are generally known as transparent conductive oxides, such as indium oxide, tin oxide, zinc oxide, titanium oxide, and composite oxides thereof, be used as the conductive oxide. From the viewpoints of transparency and conductivity, examples of conductive oxides include tin oxide and indium-tin oxide (ITO). By including the conductive oxide layer, it is possible to prevent the spectacle lens from being electrified and to prevent dust and dirt from adhering.

In addition, it is possible to further form a functional film on the multilayer film. Various functional films such as a water repellent film, a hydrophilic antifouling film, an anti-fog film and the like can be used as a functional film. Regarding these functional films, any known technique can be applied without any limitation.

<Lens Substrate>

The lens substrate provided with the multilayer film on the object-side surface and the eyeball-side surface is not particularly limited as long as the lens substrate includes a blue-light-absorbing compound. The lens substrate can be a plastic lens substrate or a glass lens substrate. The glass lens substrate can be, for example, a lens substrate made of inorganic glass. From the viewpoint of reducing weight, increasing resistance to cracking and facilitating the introduction of the blue-light-absorbing compound, the lens substrate may be a plastic lens substrate. Examples of plastics suitable for the plastic lens substrate include a styrene resin such as a (meth)acrylic resin, a polycarbonate resin, an allyl resin, an allyl carbonate resin such as a diethylene glycol bisallyl carbonate resin (CR-39), a vinyl resin, a polyester resin, a polyether resin, a urethane resin obtained by reacting an isocyanate compound with a hydroxy compound such as diethylene glycol, a thiourethane resin obtained by reacting an isocyanate compound with a polythiol compound, and a cured product obtained by curing a polymerizable compound including a (thio) epoxy compound having one or more disulfide bonds in a molecule (generally referred to as a transparent resin). As the lens substrate, one which is not dyed (colorless lens) may be used, or one which is dyed (dyed lens) may be used. The refractive index of the lens substrate is, for example, about 1.60 to 1.75. However, the refractive index of the lens substrate is not limited to this range and may be within this range or above or below this range. The refractive index, as referred to herein, is assumed to be the refractive index ne with respect to an e-line (wavelength 546.07 nm).

The spectacle lens can be of various types such as a single focus lens, a multifocal lens, a progressive addition lens, and the like. The type of the lens is determined by the surface shape of both sides of the lens substrate. In addition, the lens substrate surface may be any of a convex surface, a concave surface, and a flat surface. In ordinary lens substrates and spectacle lenses, the object-side surface is a convex surface and the eyeball-side surface is a concave surface. However, the present disclosure is not limited to such a configuration.

<Blue-Light-Absorbing Compound>

The lens substrate includes a blue-light-absorbing compound. This contributes to imparting the blue light absorption rate of 10.0% or more to the spectacle lens. The blue-light-absorbing compound can be exemplified by various compounds having absorption in the wavelength range of blue light, such as benzotriazole compounds, benzophenone compounds, triazine compounds, indole compounds, and the like. Examples of the blue-light-absorbing compound include benzotriazole compounds and indole compounds, and examples of the blue light-absorbing compound include benzotriazole compounds. The benzotriazole compound may be a benzotriazole compound represented by the following Formula (1).

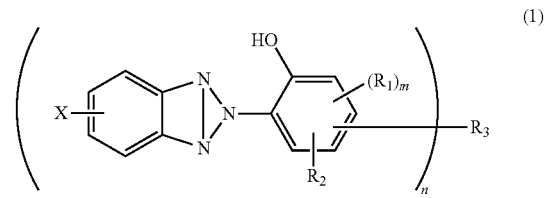

In the Formula (1), X represents a group giving a resonance effect. The substitution position of X may be the fifth position of the triazole ring.

Examples of X include a chlorine atom, a bromine atom, a fluorine atom, an iodine atom, a sulfo group, a carboxy group, a nitrile group, an alkoxy group, a hydroxy group, and an amino group.

In the Formula (1), $R_2$ represents an alkyl group having 1 to 12 carbon atoms or an alkoxy group having 1 to 12 carbon atoms, and each of the alkyl group and alkoxy group may have 1 to 8 carbon atoms, 2 to 8 carbon atoms, or 4 to 8 carbon atoms.

The alkyl group and alkoxy group may be branched or straight-chain groups.

Examples of the alkyl group include a methyl group, an ethyl group, an n-propyl group, an iso-propyl group, an n-butyl group, a sec-butyl group, a tert-butyl group, a pentyl group, a hexyl group, a heptyl group, an n-octyl group, a 1,1,3,3-tetramethylbutyl group, a nonyl group, a decyl group, an undecyl group, a dodecyl group, and the like.

Examples of the alkoxy group include a methoxy group, an ethoxy group, a propoxy group, a butoxy group, a pentyloxy group, a hexyloxy group, a heptyloxy group, an octyloxy group, a nonyloxy group, a decyloxy group, an undecyloxy group, and a dodecyloxy group.

In the Formula (1), the substitution position of $R_2$ may be third, fourth or fifth position based on the substitution position of the benzotriazolyl group.

In the Formula (1), $R_1$ represents an alkyl group having 1 to 3 carbon atoms or an alkoxy group having 1 to 3 carbon atoms, and specific examples of these groups include those having the number of carbon atoms exemplified for $R_2$. The alkyl group may be a methyl group and an ethyl group.

In the Formula (1), m represents an integer of 0 or 1.

In the Formula (1), the substitution position of $R_2$ may be the fifth based on the substitution position of the benzotriazolyl group.

n represents the valence of $R_3$ and is 1 or 2.

In the Formula (1), $R_3$ represents a hydrogen atom or a divalent hydrocarbon group having 1 to 8 carbon atoms. When n is 1, $R_3$ represents a hydrogen atom, and when n is 2, $R_3$ represents a divalent hydrocarbon group having 1 to 8 carbon atoms.

The hydrocarbon group represented by $R_3$ can be exemplified by an aliphatic hydrocarbon group and an aromatic hydrocarbon group. The number of carbon atoms in the hydrocarbon group represented by $R_3$ is 1 to 8, and may be 1 to 3.

Examples of the divalent hydrocarbon group represented by $R_3$ include a methanediyl group, an ethanediyl group, a propanediyl group, a benzenediyl group, a toluenediyl group, and the like.

In the Formula (1), the substitution position of $R_3$ may be the third position based on the substitution position of the benzotriazolyl group.

$R_3$ may be a hydrogen atom, in which case n is 1.

The benzotriazole compound may be a benzotriazole compound represented by the following Formula (1-1).

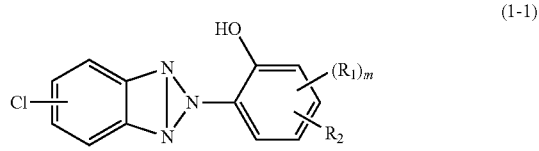

(1-1)

In the Formula (1-1), $R_1$, $R_2$, and m each have the same meaning as described above, and examples and exemplified embodiments thereof are the same as those described above.

Specific examples of the benzotriazole compound represented by the Formula (1) include methylenebis[3-(5-chloro-2-benzotriazolyl)-5-(1,1,3,3-tetramethylbutyl)-2-hydroxyphenyl], methylenebis[3-(5-chloro-2-benzotriazolyl)-5-(tert-butyl)-2-hydroxyphenyl], methylenebis[3-(5-chloro-2-benzotriazolyl)-5-tert-butyl-2-hydroxyphenyl], methylenebis[3-(5-chloro-2-benzotriazolyl)-5-ethoxy-2-hydroxyphenyl], phenylenebis[3-(5-chloro-2-benzotriazolyl)-5-(1,1,3,3-tetramethylbutyl)-2-hydroxyphenyl], and the following specific examples of the benzotriazole compounds represented by the Formula (1-1).

Specific examples of the benzotriazole compound represented by the Formula (1-1) include 2-(3-tert-butyl-2-hydroxy-5-methylphenyl)-5-chloro-2H-benzotriazole, 2-(3-tert-butyl-2-hydroxy-5-ethylphenyl)-5-chloro-2H-benzotriazole, 5-chloro-2-(3,5-dimethyl-2-hydroxyphenyl)-2H-benzotriazole, 5-chloro-2-(3,5-diethyl-2-hydroxyphenyl)-2H-benzotriazole, 5-chloro-2-(2-hydroxy-4-methoxyphenyl)-2H-benzotriazole, 5-chloro-2-(4-ethoxy-2-hydroxyphenyl)-2H-benzotriazole, 2-(4-butoxy-2-hydroxyphenyl)-5-chloro-2H-benzotriazole, and 5-chloro-2-(2-hydroxy-4-octyloxyphenyl)-2H-benzotriazole.

The benzotriazole compound represented by the Formula (1-1) may be 2-(3-tert-butyl-2-hydroxy-5-methylphenyl)-5-chloro-2H-benzotriazole, 2-(3-tert-butyl-2-hydroxy-5-ethylpheny)-5-chloro-2H-benzotriazole, 5-chloro-2-(4-ethoxy-2-hydroxyphenyl)-2H-benzotriazole, or 2-(4-butoxy-2-hydroxyphenyl)-5-chloro-2H-benzotriazole.

For example, the lens substrate can include 0.05 parts by mass to 3.00 parts by mass, 0.05 parts by mass to 2.50 parts by mass, 0.10 parts by mass to 2.00 parts by mass, or 0.30 parts by mass to 2.00 parts by mass of the blue-light-absorbing compound with respect to 100 parts by mass of the resin (or the polymerizable compound for obtaining the resin) constituting the lens substrate. However, the content of the blue-light-absorbing compound is not limited to these ranges, provided that the blue light absorption rate of the spectacle lens can be 10.0% or more. A well-known method can be used for producing a lens substrate including a blue-light-absorbing compound. For example, a lens substrate including a blue-light-absorbing compound can be obtained by adding the blue-light-absorbing compound to the polymerizable composition in a method of polymerizing a polymerizable composition to obtain a lens substrate as a lens-shaped molded article. Alternatively, a blue-light-absorbing colorant can be introduced into the lens substrate by various wet or dry methods generally used as a dyeing method for a lens substrate. For example, a dipping method (immersion method) can be mentioned as an example of a wet method, and a sublimation dyeing method can be mentioned as an example of a dry method.

In addition, the lens substrate may include various additives which may be generally included in the lens substrate of the spectacle lens. For example, in the case of molding a lens substrate by polymerizing a polymerizable composition including a polymerizable compound and a blue-light-absorbing compound, one or more additives such as polymerization catalysts disclosed, for example, in Japanese Patent Application Publication No. H07-063902, Japanese Patent Application Publication No. H07-104101, Japanese Patent Application Publication No. H09-208621, Japanese Patent Application Publication No. H09-255781, and the like, and internal release agents, antioxidants, fluorescent whitening agents, bluing agent and the like disclosed Japanese Patent Application Publication No. H01-163012, Japanese Patent Application Publication No. H03-281312, and the like may be added to the polymerizable composition. Regarding the types and amounts of these additives and methods for molding the lens substrate using the polymerizable composition, known techniques can be applied without any limitation.

The spectacle lens has a multilayer film having a high blue light reflectance on both sides and the blue light absorption rate of the spectacle lens is 10.0% or more. As a result, it is possible to realize a high blue light cut rate of the spectacle lens. The blue light cut rate may be 30.0% or more, 33.0% or more, 35.0% or more, 36.0% or more, or 38.0% or more. Further, the blue light cut rate can be, for example, 50.0% or less. The blue light cut rate may be more than 50.0%.

Further, in one embodiment, the spectacle lens can have high luminous transmittance and excellent transparency. The luminous transmittance of the spectacle lens may be 90.0% or more, 92.0% or more, or in the range of 92.5% to 99.0%.

[Spectacles]

According to another embodiment of the present disclosure, there can be provided spectacles having the spectacle lens according to the above embodiment of the present disclosure and a frame to which the spectacle lens is attached. The spectacle lens has been described hereinabove in detail. By providing the spectacles with such a spectacle lens, it is possible to effectively reduce the effect of blue light on the wearer's eyes. Other features of the spectacles are not particularly limited and known techniques can be used.

EXAMPLES

Hereinafter, the present disclosure will be further described with reference to examples, but the present disclosure is not limited to the embodiments shown in the examples. Hereinafter, the refractive index is the refractive index at a wavelength of 500 nm. Regarding the optical film thickness, $\lambda=500$ nm. The unit of the physical film thickness is nm.

Example 1

(1) Molding of Lens Substrate (Lens Substrate Made of Thiourethane Resin) by Cast Polymerization A monomer composition (polymerizable composition) for a lens was prepared by stirring and mixing 100.00 parts by mass of bis-(β-epithiopropyl) sulfide and 0.40 parts by mass of 2-(3-tertbutyl-2-hydroxy-5-methylphenyl)-5-chloro-2H-benzotriazole as a blue-light-absorbing compound, then adding 0.05 parts by mass of tetra-n-butylphosphonium bromide as a catalyst, and stirring and mixing under a reduced pressure of 10 mmHg for 3 min. Next, this monomer composition for a lens was poured into a lens molding mold (0.00 D, wall thickness 1.6 mm) composed of a glass mold and a resin gasket prepared in advance, and polymerization was carried out for 20 h in an electric furnace at a furnace temperature of 20° C. to 100° C. After completion of the polymerization, the gasket and the mold were removed, followed by heat treatment for 1 h at 110° C. to obtain a plastic lens (lens substrate). The obtained lens substrate had a convex surface on the object-side surface and a concave surface on the eyeball-side surface, and a refractive index of 1.60.

(2) Formation of Multilayer Film

After processing (polishing) both surfaces of the lens substrate to the level of an optical surface, a hard coat was formed. The hard coat layer had the thickness shown in Table 1 and the refractive index was 1.62.
A multilayer vapor-deposited film having a total of seven layers was successively formed by ion-assisted vapor deposition by using oxygen gas and nitrogen gas as assist gases on the hard coat surface on the convex surface side (object side) of the resulting lens substrate which had the convex object-side surface and the concave eyeball-side surface and was optically finished on both surfaces and provided with the hard coat in advance.
A multilayer vapor-deposited film having a total of seven layers was laminated by ion-assisted vapor deposition under the same conditions also on the hard coat surface on the concave surface side (eyeball side) to obtain a spectacle lens.
The multilayer vapor-deposited film was formed on both the convex surface side and the concave surface side by using the vapor deposition sources shown in Table 1 and layering in the order of the first layer, the second layer . . . , with the outermost layer on the spectacle lens surface side being the seventh layer, from the lens substrate side (hard coat side) toward the spectacle lens surface.

Evaporation sources (film forming materials) in the examples were composed of oxides shown in Table 1 and included impurities that could be mixed unavoidably. Table 1 shows the refractive index of each oxide and the film thickness of each layer. These points are the same for Examples and Comparative Examples which will be described hereinbelow.

Example 2

(1) Molding of Lens Substrate (Lens Substrate Made of Thiourethane Resin) by Cast Polymerization A plastic lens (lens substrate) was obtained by the same method as in Example 1, except that 100.00 parts by mass of n-butyl thioglycolate was used in place of 100.00 parts by mass of bis(β-epithiopropyl) sulfide. The obtained lens substrate had a convex surface on the object side, a concave surface on the eyeball side, and a refractive index of 1.67.

(2) Formation of Multilayer Film

After processing (polishing) both surfaces of the lens substrate to the level of an optical surface, a hard coat was formed. The hard coat layer had the thickness shown in Table 1 and the refractive index was 1.68.
A multilayer vapor-deposited film having a total of seven layers was successively formed by ion-assisted vapor deposition by using oxygen gas and nitrogen gas as assist gases on the hard coat surface on the convex surface side (object side) of the resulting lens substrate which had the convex object-side surface and the concave eyeball-side surface and was optically finished on both surfaces and provided with the hard coat in advance.
A multilayer vapor-deposited film having a total of seven layers was laminated by ion-assisted vapor deposition under the same conditions also on the hard coat surface on the concave surface side (eyeball side) to obtain a spectacle lens.
The multilayer vapor-deposited film was formed on both the convex surface side and the concave surface side by using the vapor deposition sources shown in Table 1 and layering in the order of the first layer, the second layer . . . , with the outermost layer on the spectacle lens surface side being the seventh layer, from the lens substrate side (hard coat side) toward the spectacle lens surface.

Example 3

(1) Molding of Lens Substrate (Lens Substrate Made of Thiourethane Resin) by Cast Polymerization A monomer composition (polymerizable composition) for a lens was prepared by stirring and mixing 100.00 parts by mass of bis-(β-epithiopropyl) sulfide and 0.10 parts by mass of 2-(3-tertbutyl-2-hydroxy-5-methylphenyl)-5-chloro-2H-benzotriazole as a blue-light-absorbing compound, then adding 0.05 parts by mass of tetra-n-butylphosphonium bromide as a catalyst, and stirring and mixing under a reduced pressure of 10 mmHg for 3 min. Next, this monomer composition for a lens was poured into a lens molding mold (0.00 D, wall thickness 1.6 mm) composed of a glass mold and a resin gasket prepared in advance, and polymerization was carried out for 20 h in an electric furnace at a furnace temperature of 20° C. to 100° C. After completion of the polymerization, the gasket and the mold were removed, followed by heat treatment for 1 h at 110° C. to obtain a plastic lens (lens substrate). The obtained lens substrate had a convex surface on the object-side surface and a concave surface on the eyeball-side surface, and a refractive index of 1.60.

(2) Formation of Multilayer Film

After processing (polishing) both surfaces of the lens substrate to the level of an optical surface, a hard coat was formed. The hard coat layer had the thickness shown in Table 1 and the refractive index was 1.62.

A multilayer vapor-deposited film having a total of seven layers was successively formed by ion-assisted vapor deposition by using oxygen gas and nitrogen gas as assist gases on the hard coat surface on the convex surface side (object side) of the resulting lens substrate which had the convex object-side surface and the concave eyeball-side surface and was optically finished on both surfaces and provided with the hard coat in advance.

A multilayer vapor-deposited film having a total of seven layers was laminated by ion-assisted vapor deposition under the same conditions also on the hard coat surface on the concave surface side (eyeball side) to obtain a spectacle lens.

The multilayer vapor-deposited film was formed on both the convex surface side and the concave surface side by using the vapor deposition sources shown in Table 1 and layering in the order of the first layer, the second layer . . . , with the outermost layer on the spectacle lens surface side being the seventh layer, from the lens substrate side (hard coat side) toward the spectacle lens surface.

Comparative Example 1

(1) Molding of Lens Substrate (Lens Substrate Made of Thiourethane Resin) by Cast Polymerization A monomer composition (polymerizable composition) for a lens was prepared by adding 0.05 parts by mass of tetra-n-butylphosphonium bromide as a catalyst to 100.00 parts by mass of bis-(β-epithiopropyl) sulfide, and stirring and mixing under a reduced pressure of 10 mmHg for 3 min. Next, this monomer composition for a lens was poured into a lens molding mold (0.00 D, wall thickness 1.6 mm) composed of a glass mold and a resin gasket prepared in advance, and polymerization was carried out for 20 h in an electric furnace at a furnace temperature of 20° C. to 100° C. After completion of the polymerization, the gasket and the mold were removed, followed by heat treatment for 1 h at 110° C. to obtain a plastic lens (lens substrate). The obtained lens substrate had a convex surface on the object-side surface and a concave surface on the eyeball-side surface, and a refractive index of 1.60. The lens substrate molded herein did not include the blue-light-absorbing compound.

(2) Formation of Multilayer Film

After processing (polishing) both surfaces of the lens substrate to the level of an optical surface, a hard coat was formed. The hard coat layer had the thickness shown in Table 1 and the refractive index was 1.62.

A multilayer vapor-deposited film having a total of seven layers was successively formed by ion-assisted vapor deposition by using oxygen gas and nitrogen gas as assist gases on the hard coat surface on the convex surface side (object side) of the resulting lens substrate which had the convex object-side surface and the concave eyeball-side surface and was optically finished on both surfaces and provided with the hard coat in advance.

A multilayer vapor-deposited film having a total of seven layers was laminated by ion-assisted vapor deposition under the same conditions also on the hard coat surface on the concave surface side (eyeball side) to obtain a spectacle lens.

The multilayer vapor-deposited film was formed on both the convex surface side and the concave surface side by using the vapor deposition sources shown in Table 1 and layering in the order of the first layer, the second layer . . . , with the outermost layer on the spectacle lens surface side being the seventh layer, from the lens substrate side (hard coat side) toward the spectacle lens surface.

Comparative Example 2

(1) Molding of Lens Substrate (Lens Substrate Made of Thiourethane Resin) by Cast Polymerization A plastic lens (lens substrate) was obtained by the same method as in Comparative Example 1, except that 100.00 parts by mass of n-butyl thioglycolate was used in place of 100.00 parts by mass of bis(β-epithiopropyl) sulfide. The obtained lens substrate had a convex surface on the object side, a concave surface on the eyeball side, and a refractive index of 1.67. The lens substrate molded herein did not include the blue-light-absorbing compound.

(2) Formation of Multilayer Film

After processing (polishing) both surfaces of the lens substrate to the level of an optical surface, a hard coat was formed. The hard coat layer had the thickness shown in Table 1 and the refractive index was 1.68.

A multilayer vapor-deposited film having a total of seven layers was successively formed by ion-assisted vapor deposition by using oxygen gas and nitrogen gas as assist gases on the hard coat surface on the convex surface side (object side) of the resulting lens substrate which had the convex object-side surface and the concave eyeball-side surface and was optically finished on both surfaces and provided with the hard coat in advance.

A multilayer vapor-deposited film having a total of seven layers was laminated by ion-assisted vapor deposition under the same conditions also on the hard coat surface on the concave surface side (eyeball side) to obtain a spectacle lens.

The multilayer vapor-deposited film was formed on both the convex surface side and the concave surface side by using the vapor deposition sources shown in Table 1 and layering in the order of the first layer, the second layer . . . , with the outermost layer on the spectacle lens surface side being the seventh layer, from the lens substrate side (hard coat side) toward the spectacle lens surface.

Examples 4 to 8, Comparative Examples 3 and 4

(1) Molding of Lens Substrate (Lens Substrate Made of Thiourethane Resin) by Cast Polymerization Plastic lenses (lens substrates) were obtained by the same method as in Example 1. The obtained lens substrates had a convex surface on the object side, a concave surface on the eyeball side, and a refractive index of 1.60.

(2) Formation of Multilayer Film

After processing (polishing) both surfaces of the lens substrate to the level of an optical surface, a hard coat was formed. The hard coat layer had the thickness shown in Table 1 and the refractive index was 1.62.

A multilayer vapor-deposited film having a total of seven layers was successively formed by ion-assisted vapor deposition by using oxygen gas and nitrogen gas as assist gases on the hard coat surface on the convex surface side (object side) of the resulting lens substrate which had the convex object-side surface and the concave eyeball-side surface and was optically finished on both surfaces and provided with the hard coat in advance.

A multilayer vapor-deposited film having a total of seven layers was laminated by ion-assisted vapor deposition under the same conditions also on the hard coat surface on the concave surface side (eyeball side) to obtain a spectacle lens.

The multilayer vapor-deposited film was formed on both the convex surface side and the concave surface side by using the vapor deposition sources shown in Table 1 and layering in the order of the first layer, the second layer . . . , with the outermost layer on the spectacle lens surface side being the seventh layer, from the lens substrate side (hard coat side) toward the spectacle lens surface.

Example 9

(1) Molding of Lens Substrate (Lens Substrate Made of Thiourethane Resin) by Cast Polymerization A plastic lens (lens substrate) was obtained by the same method as in Example 2. The obtained lens substrate had a convex surface on the object side, a concave surface on the eyeball side, and a refractive index of 1.67.

(2) Formation of Multilayer Film

After processing (polishing) both surfaces of the lens substrate to the level of an optical surface, a hard coat was formed. The hard coat layer had the thickness shown in Table 1 and the refractive index was 1.68.

A multilayer vapor-deposited film having a total of five layers was successively formed by ion-assisted vapor deposition by using oxygen gas and nitrogen gas as assist gases on the hard coat surface on the convex surface side (object side) of the resulting lens substrate which had the convex object-side surface and the concave eyeball-side surface and was optically finished on both surfaces and provided with the hard coat in advance.

A multilayer vapor-deposited film having a total of five layers was laminated by ion-assisted vapor deposition under the same conditions also on the hard coat surface on the concave surface side (eyeball side) to obtain a spectacle lens.

The multilayer vapor-deposited film was formed on both the convex surface side and the concave surface side by using the vapor deposition sources shown in Table 1 and layering in the order of the first layer, the second layer . . . , with the outermost layer on the spectacle lens surface side being the fifth layer, from the lens substrate side (hard coat side) toward the spectacle lens surface.

Reference Example 1

(1) Molding of Lens Substrate (Lens Substrate Made of Thiourethane Resin) by Cast Polymerization A plastic lens (lens substrate) was obtained by the same method as in Example 1. The obtained lens substrate had a convex surface on the object side, a concave surface on the eyeball side, and a refractive index of 1.60.

(2) Formation of Multilayer Film (Antireflection Film)

After processing (polishing) both surfaces of the lens substrate to the level of an optical surface, a hard coat was formed. The hard coat layer had the thickness shown in Table 1 and the refractive index was 1.62.

A multilayer vapor-deposited film having a total of five layers was successively formed by ion-assisted vapor deposition by using oxygen gas and nitrogen gas as assist gases on the hard coat surface on the convex surface side (object side) of the resulting lens substrate which had the convex object-side surface and the concave eyeball-side surface and was optically finished on both surfaces and provided with the hard coat in advance.

A multilayer vapor-deposited film having a total of five layers was laminated by ion-assisted vapor deposition under the same conditions also on the hard coat surface on the concave surface side (eyeball side) to obtain a spectacle lens.

The multilayer vapor-deposited film was formed on both the convex surface side and the concave surface side by using the vapor deposition sources shown in Table 1 (Table 1-1 to Table 1-6) and layering in the order of the first layer, the second layer . . . , with the outermost layer on the spectacle lens surface side being the fifth layer, from the lens substrate side (hard coat side) toward the spectacle lens surface.

The multilayer vapor-deposited film formed in Reference Example 1 is usually a multilayer film formed as an antireflection film on a spectacle lens. In Table 1, "RI" represents Refractive index, "FFM" represents Film-forming material, "PFT" represents Physical film thickness, and "OFT" represents Optical film thickness.

TABLE 1

| Lens | | | Example 1 | | | | Reference Example 1 | | | | Comparative Example 1 | | | |
|---|---|---|---|---|---|---|---|---|---|---|---|---|---|---|
| | RI 1.60 | | Object side Blue-light-absorbing compound: present | | Eyeball side | | Object side Blue-light-absorbing compound: present | | Eyeball side | | Object side Blue-light-absorbing compound: not present | | Eyeball side | |
| substrate | FFM | RI | PFT | OFT | PFT | OFT | PFT | OFT | PFT | OFT | PFT | OFT | PFT | OFT |
| Hard coat | — | 1.62 | 2500 | 8.100 λ | 2500 | 8.100 λ | 2500 | 8.100 λ | 2500 | 8.100 λ | 2500 | 40.500 λ | 2500 | 40.500 λ |
| 1st layer | $SiO_2$ | 1.46 | 35.1 | 0.102 λ | 47.6 | 0.139 λ | 182.1 | 0.532 λ | 172.1 | 0.503 λ | 35.1 | 0.102 λ | 47.6 | 0.139 λ |

TABLE 1-continued

| | | | Example 1 | | | | Comparative Example 1 | | | | (continued) | | | |
|---|---|---|---|---|---|---|---|---|---|---|---|---|---|---|
| 2nd layer | ZrO$_2$ | 2.09 | 11.8 | 0.049 λ | 12.8 | 0.054 λ | 18.4 | 0.077 λ | 14.9 | 0.062 λ | 11.8 | 0.049 λ | 12.8 | 0.054 λ |
| 3th layer | SiO$_2$ | 1.46 | 309.1 | 0.903 λ | 307.4 | 0.898 λ | 24.3 | 0.071 λ | 27.8 | 0.081 λ | 309.1 | 0.903 λ | 307.4 | 0.898 λ |
| 4th layer | ZrO$_2$ | 2.09 | 25.6 | 0.107 λ | 30.4 | 0.127 λ | 81.1 | 0.339 λ | 84.1 | 0.352 λ | 25.6 | 0.107 λ | 30.4 | 0.127 λ |
| 5th layer | SiO$_2$ | 1.46 | 52.1 | 0.152 λ | 38.5 | 0.112 λ | 98.7 | 0.288 λ | 100.7 | 0.294 λ | 52.1 | 0.152 λ | 38.5 | 0.112 λ |
| 6th layer | ZrO$_2$ | 2.09 | 64.6 | 0.270 λ | 87.3 | 0.365 λ | — | — | — | — | 64.6 | 0.270 λ | 87.3 | 0.365 λ |
| 7th layer | SiO$_2$ | 1.46 | 117.8 | 0.344 λ | 108.6 | 0.317 λ | — | — | — | — | 117.8 | 0.344 λ | 108.6 | 0.317 λ |

| | | | Example 2 | | | | Comparative Example 2 | | | |
|---|---|---|---|---|---|---|---|---|---|---|
| | | | Object side | | Eyeball side | | Object side | | Eyeball side | |
| Lens | RI 1.67 | | Blue-light-absorbing compound: present | | | | Blue-light-absorbing compound: not present | | | |
| substrate | FFM | RI | PFT | OFT | PFT | OFT | PFT | OFT | PFT | OFT |
| Hard coat | — | 1.68 | 2500 | 8.400 λ | 2500 | 8.400 λ | 2500 | 8.400 λ | 2500 | 8.400 λ |
| 1st layer | SiO$_2$ | 1.46 | 35.1 | 0.102 λ | 47.6 | 0.139 λ | 35.1 | 0.102 λ | 47.6 | 0.139 λ |
| 2nd layer | ZrO$_2$ | 2.09 | 8.8 | 0.037 λ | 9.8 | 0.041 λ | 8.8 | 0.037 λ | 9.8 | 0.041 λ |
| 3th layer | SiO$_2$ | 1.46 | 309.1 | 0.903 λ | 307.4 | 0.898 λ | 309.1 | 0.903 λ | 307.4 | 0.898 λ |
| 4th layer | ZrO$_2$ | 2.09 | 24.6 | 0.103 λ | 26.4 | 0.110 λ | 24.6 | 0.103 λ | 26.4 | 0.110 λ |
| 5th layer | SiO$_2$ | 1.46 | 51.1 | 0.149 λ | 42.5 | 0.124 λ | 51.1 | 0.149 λ | 42.5 | 0.124 λ |
| 6th layer | ZrO$_2$ | 2.09 | 64.6 | 0.270 λ | 83.3 | 0.348 λ | 64.6 | 0.270 λ | 83.3 | 0.348 λ |
| 7th layer | SiO$_2$ | 1.46 | 117.8 | 0.344 λ | 108.6 | 0.317 λ | 117.08 | 0.344 λ | 108.6 | 0.317 λ |

| | | | Example 3 | | | | Comparative Example 3 | | | | Comparative Example 4 | | | |
|---|---|---|---|---|---|---|---|---|---|---|---|---|---|---|
| | | | Object side | | Eyeball side | | Object side | | Eyeball side | | Object side | | Eyeball side | |
| Lens | RI 1.60 | | Blue-light-absorbing compound: present | | | | Blue-light-absorbing compound: present | | | | Blue-light-absorbing compound: present | | | |
| substrate | FFM | RI | PFT | OFT | PFT | OFT | PFT | OFT | PFT | OFT | PFT | OFT | PFT | OFT |
| Hard coat | — | 1.62 | 2500 | 8.100 λ | 2500 | 8.100 λ | 2500 | 8.100 λ | 2500 | 8.100 λ | 2500 | 12500.000 λ | 2500 | 12500.000 λ |
| 1st layer | SiO$_2$ | 1.46 | 35.1 | 0.102 λ | 35.1 | 0.102 λ | 24.6 | 0.072 λ | 24.6 | 0.072 λ | 24.6 | 0.072 λ | 24.6 | 0.072 λ |
| 2nd layer | ZrO$_2$ | 2.09 | 10.0 | 0.042 λ | 10.0 | 0.042 λ | 13.1 | 0.055 λ | 13.1 | 0.055 λ | 13.1 | 0.055 λ | 13.1 | 0.055 λ |
| 3th layer | SiO$_2$ | 1.46 | 319.3 | 0.932 λ | 319.3 | 0.932 λ | 168.0 | 0.491 λ | 168.0 | 0.491 λ | 168.0 | 0.491 λ | 168.0 | 0.491 λ |
| 4th layer | ZrO$_2$ | 2.09 | 27.7 | 0.116 λ | 27.7 | 0.116 λ | 24.4 | 0.102 λ | 24.6 | 0.102 λ | 24.4 | 0.102 λ | 24.4 | 0.102 λ |
| 5th layer | SiO$_2$ | 1.46 | 51.1 | 0.149 λ | 51.1 | 0.149 λ | 46.8 | 0.137 λ | 46.8 | 0.137 λ | 44.0 | 0.129 λ | 46.8 | 0.137 λ |
| 6th layer | ZrO$_2$ | 2.09 | 60.7 | 0.254 λ | 60.7 | 0.254 λ | 75.9 | 0.317 λ | 75.9 | 0.317 λ | 78.2 | 0.327 λ | 75.9 | 0.317 λ |
| 7th layer | SiO$_2$ | 1.46 | 114.9 | 0.336 λ | 114.9 | 0.336 λ | 113.2 | 0.331 λ | 113.2 | 0.331 λ | 112.0 | 0.327 λ | 113.2 | 0.331 λ |

| | | | Example 4 | | | | Example 5 | | | | Example 6 | | | |
|---|---|---|---|---|---|---|---|---|---|---|---|---|---|---|
| | | | Object side | | Eyeball side | | Object side | | Eyeball side | | Object side | | Eyeball side | |
| Lens | RI 1.60 | | Blue-light-absorbing compound: present | | | | Blue-light-absorbing compound: present | | | | Blue-light-absorbing compound: present | | | |
| substrate | FFM | RI | PFT | OFT | PFT | OFT | PFT | OFT | PFT | OFT | PFT | OFT | PFT | OFT |
| Hard coat | — | 1.62 | 2500 | 8.100 λ | 2500 | 8.100 λ | 2500 | 8.100 λ | 2500 | 8.100 λ | 2500 | 40.500 λ | 2500 | 40.500 λ |
| 1st layer | SiO$_2$ | 1.46 | 35.1 | 0.102 λ | 47.6 | 0.139 λ | 35.1 | 0.102 λ | 47.6 | 0.139 λ | 35.1 | 0.102 λ | 47.6 | 0.139 λ |
| 2nd layer | ZrO$_2$ | 2.09 | 8.8 | 0.037 λ | 8.8 | 0.037 λ | 8.8 | 0.037 λ | 8.8 | 0.037 λ | 8.8 | 0.037 λ | 8.8 | 0.037 λ |
| 3th layer | SiO$_2$ | 1.46 | 309.1 | 0.903 λ | 307.4 | 0.898 λ | 309.1 | 0.903 λ | 307.4 | 0.898 λ | 309.1 | 0.903 λ | 307.4 | 0.898 λ |
| 4th layer | ZrO$_2$ | 2.09 | 22.1 | 0.092 λ | 26.4 | 0.110 λ | 22.1 | 0.092 λ | 26.4 | 0.110 λ | 22.1 | 0.092 λ | 26.4 | 0.110 λ |
| 5th layer | Sio$_2$ | 1.46 | 49.1 | 0.143 λ | 38.5 | 0.112 λ | 49.1 | 0.143 λ | 38.5 | 0.112 λ | 49.1 | 0.143 λ | 38.5 | 0.112 λ |
| 6th layer | ZrO$_2$ | 2.09 | 64.6 | 0.270 λ | 84.8 | 0.354 λ | 66.2 | 0.277 λ | 87.8 | 0.367 λ | 64.6 | 0.270 λ | 84.8 | 0.354 λ |

TABLE 1-continued

| | | | Example 7 | | | | Example 8 | | | |
|---|---|---|---|---|---|---|---|---|---|---|
| 7th layer | SiO$_2$ | 1.46 | 114.3 | 0.334 λ | 107.1 | 0.313 λ | 114.3 | 0.334 λ | 107.7 | 0.315 λ | 114.3 | 0.334 λ | 107.1 | 0.313 λ |

| | | | Example 7 | | | | Example 8 | | | |
|---|---|---|---|---|---|---|---|---|---|---|
| | RI | | Object side | | Eyeball side | | Object side | | Eyeball side | |
| Lens | 1.60 | | Blue-light-absorbing compound: present | | | | Blue-light-absorbing compound: present | | | |
| substrate | FFM | RI | PFT | OFT | PFT | OFT | PFT | OFT | PFT | OFT |
| Hard coat | — | 1.62 | 2500 | 8.100 λ | 2500 | 8.100 λ | 2500 | 8.100 λ | 2500 | 8.100 λ |
| 1st layer | SiO$_2$ | 1.46 | 35.1 | 0.102 λ | 47.6 | 0.139 λ | 35.1 | 0.102 λ | 47.6 | 0.139 λ |
| 2nd layer | ZrO$_2$ | 2.09 | 11.8 | 0.049 λ | 8.8 | 0.037 λ | 8.8 | 0.037 λ | 12.8 | 0.054 λ |
| 3th layer | SiO$_2$ | 1.46 | 309.1 | 0.903 λ | 307.4 | 0.898 λ | 309.1 | 0.903 λ | 307.4 | 0.898 λ |
| 4th layer | ZrO$_2$ | 2.09 | 25.6 | 0.107 λ | 26.4 | 0.110 λ | 22.1 | 0.092 λ | 30.4 | 0.127 λ |
| 5th layer | SiO$_2$ | 1.46 | 52.1 | 0.152 λ | 38.5 | 0.112 λ | 49.1 | 0.143 λ | 38.5 | 0.112 λ |
| 6th layer | ZrO$_2$ | 2.09 | 64.6 | 0.270 λ | 84.8 | 0.354 λ | 64.6 | 0.270 λ | 87.3 | 0.365 λ |
| 7th layer | SiO$_2$ | 1.46 | 117.8 | 0.334 λ | 107.1 | 0.313 λ | 114.3 | 0.334 λ | 108.6 | 0.317 λ |

| | | | Example 9 | | | |
|---|---|---|---|---|---|---|
| | RI | | Object side | | Eyeball side | |
| Lens | 1.67 | | Blue-light-absorbing compound: present | | | |
| substrate | FFM | RI | PFT | OFT | PFT | OFT |
| Hard coat | — | 1.68 | 2500 | 8.400 λ | 2500 | 8.400 λ |
| 1st layer | SiO$_2$ | 1.46 | 88.6 | 0.259 λ | 74.8 | 0.218 λ |
| 2nd layer | ZrO$_2$ | 2.09 | 20.2 | 0.085 λ | 24.4 | 0.102 λ |
| 3rd layer | SiO$_2$ | 1.46 | 53.4 | 0.156 λ | 39.3 | 0.115 λ |
| 4th layer | ZrO$_2$ | 2.09 | 60.9 | 0.255 λ | 87.1 | 0.364 λ |
| 5th layer | SiO$_2$ | 1.46 | 103.0 | 0.301 λ | 99.2 | 0.290 λ |

[Evaluation of Spectacle Lens]

(1) Measurement of Blue Light Reflectance and Luminous Reflectance on Object-Side Surface and Eyeball-Side Surface of Spectacle Lens A direct-incidence reflection spectroscopic characteristic was measured using a spectrophotometer U4100 manufactured by Hitachi, Ltd. on the optical center of the object-side surface (convex surface side) and the eyeball-side surface (concave surface side) of the spectacle lenses of Examples, Comparative Examples, and Reference Example (measurement pitch: 1 nm). In order to suppress reflection from the non-measurement surface, the non-measurement surface was painted in black without gloss as described in Section 5.2 of JIS T 7334.

The average reflectance and the luminous reflectance in the wavelength range of 400 nm to 500 nm were respectively determined by the above-described methods by using the measurement results.

(2) Measurement of Blue Light Absorption Rate, Blue Light Cut Rate and Luminous Transmittance of Spectacle Lens The direct-incidence reflection spectroscopic characteristic of the spectacle lenses of Examples, Comparative Examples, and Reference Example was measured from the surface side (convex surface side) on the object side of the spectacle lens by using a spectrophotometer U4100 manufactured by Hitachi, Ltd. with a wavelength of 380 nm to 500 nm with a 1 nm pitch.

The blue light absorption rate, the blue light cut rate, and the luminous transmittance of the spectacle lenses were determined by the above-described methods by using the measurement results.

Reflection spectra and transmission spectra of the spectacle lenses of Examples, Comparative Examples, and Reference Example thus obtained are shown in FIGS. 1 to 14. In the figures, the solid line spectrum is the reflection (R) spectrum, and the broken line spectrum is the transmission (T) spectrum. FIGS. 1 to 14 are as follows.

FIG. 1 shows a reflection spectrum and a transmission spectrum of the spectacle lens of Example 1.

Figure 2:
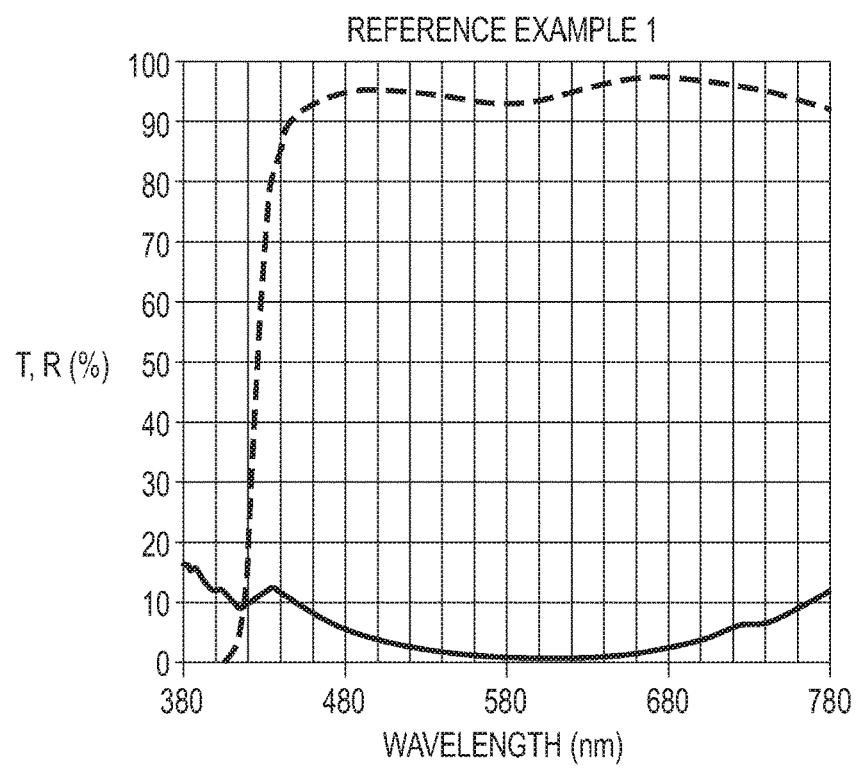
FIG. 2 shows a reflection spectrum and a transmission spectrum of the spectacle lens of Reference Example 1.

FIG. 2 shows a reflection spectrum and a transmission spectrum of the spectacle lens of Reference Example 1.

Figure 3:
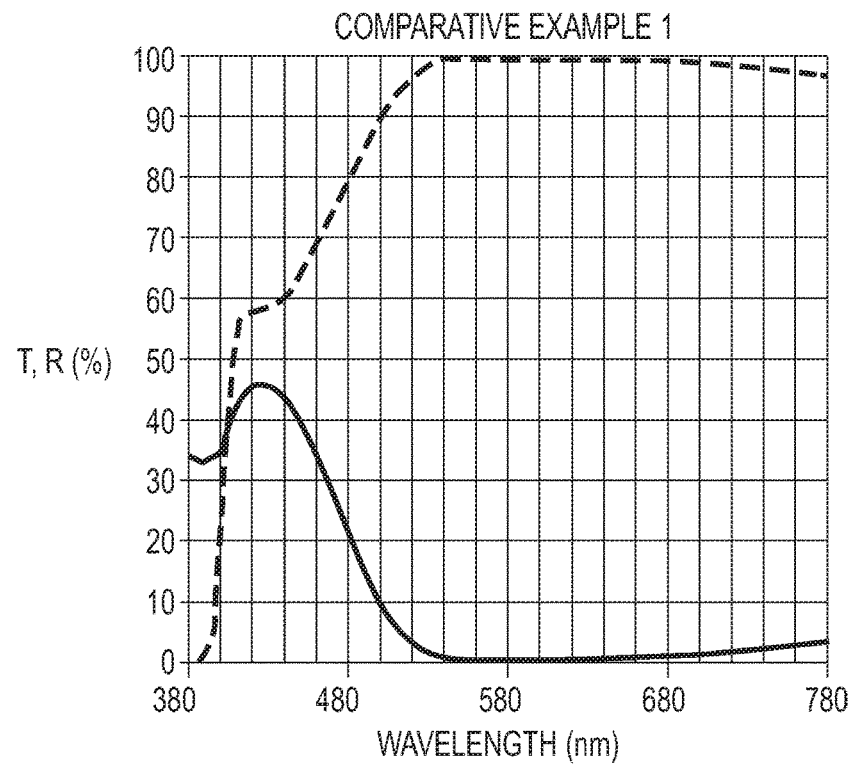
FIG. 3 shows a reflection spectrum and a transmission spectrum of the spectacle lens of Comparative Example 1.

FIG. 3 shows a reflection spectrum and a transmission spectrum of the spectacle lens of Comparative Example 1.

Figure 4:
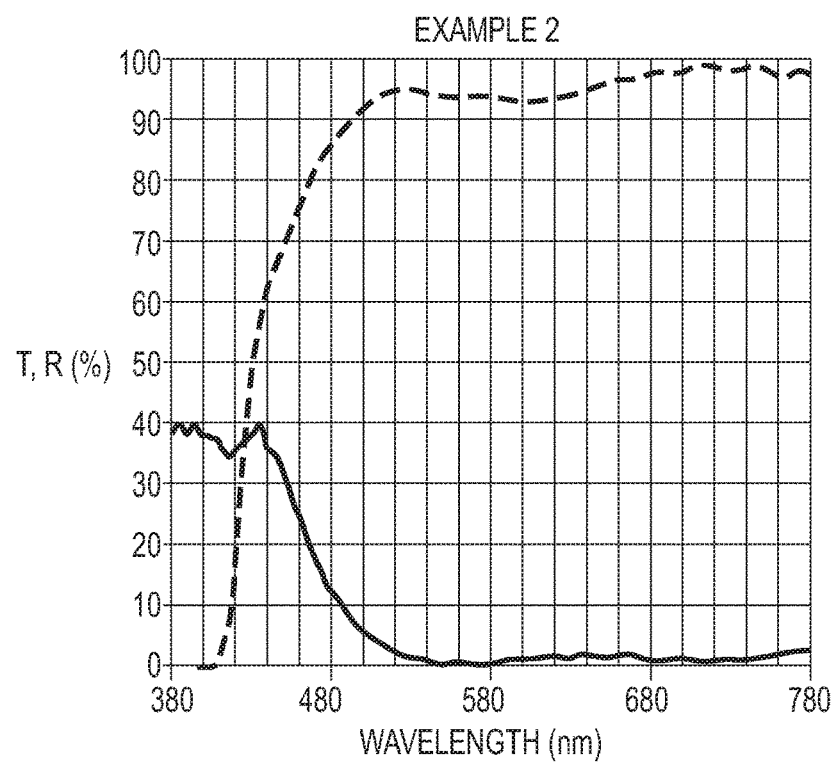
FIG. 4 shows a reflection spectrum and a transmission spectrum of the spectacle lens of Example 2.

FIG. 4 shows a reflection spectrum and a transmission spectrum of the spectacle lens of Example 2.

Figure 5:
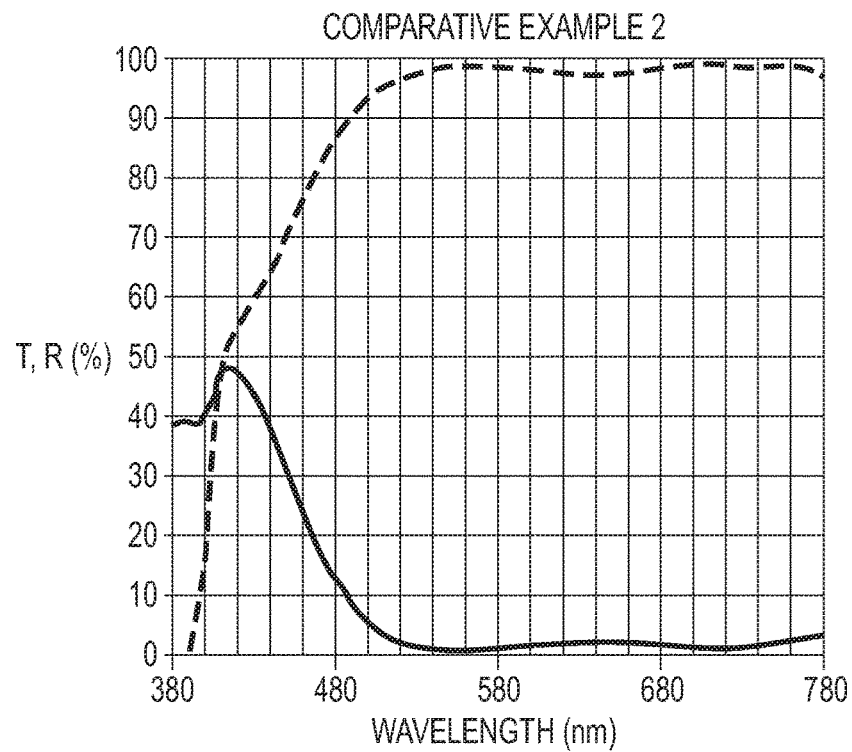
FIG. 5 shows a reflection spectrum and a transmission spectrum of the spectacle lens of Comparative Example 2.

FIG. 5 shows a reflection spectrum and a transmission spectrum of the spectacle lens of Comparative Example 2.

Figure 6:
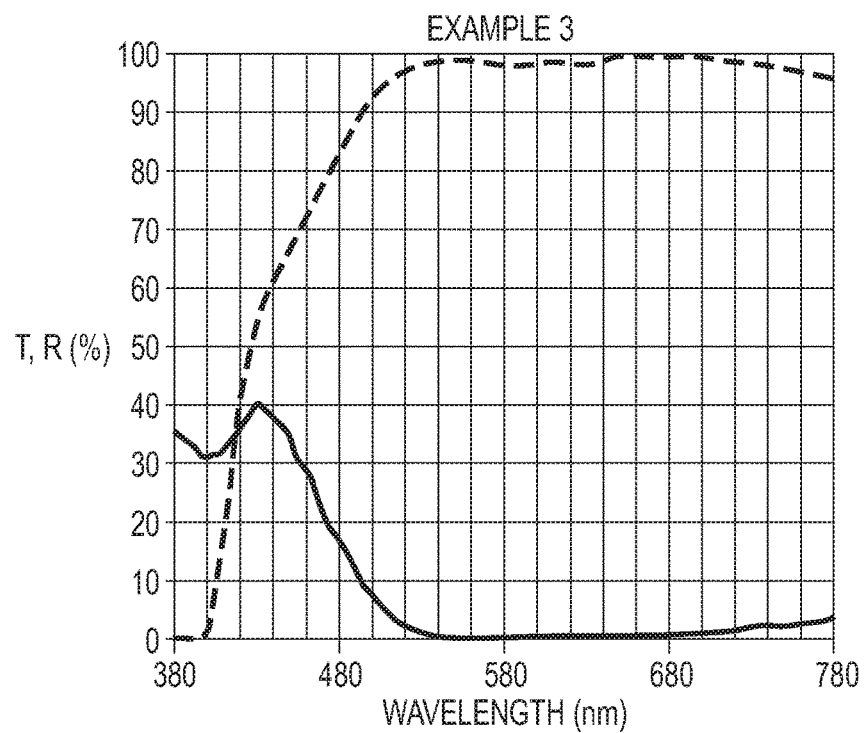
FIG. 6 shows a reflection spectrum and a transmission spectrum of the spectacle lens of Example 3.

FIG. 6 shows a reflection spectrum and a transmission spectrum of the spectacle lens of Example 3.

Figure 7:
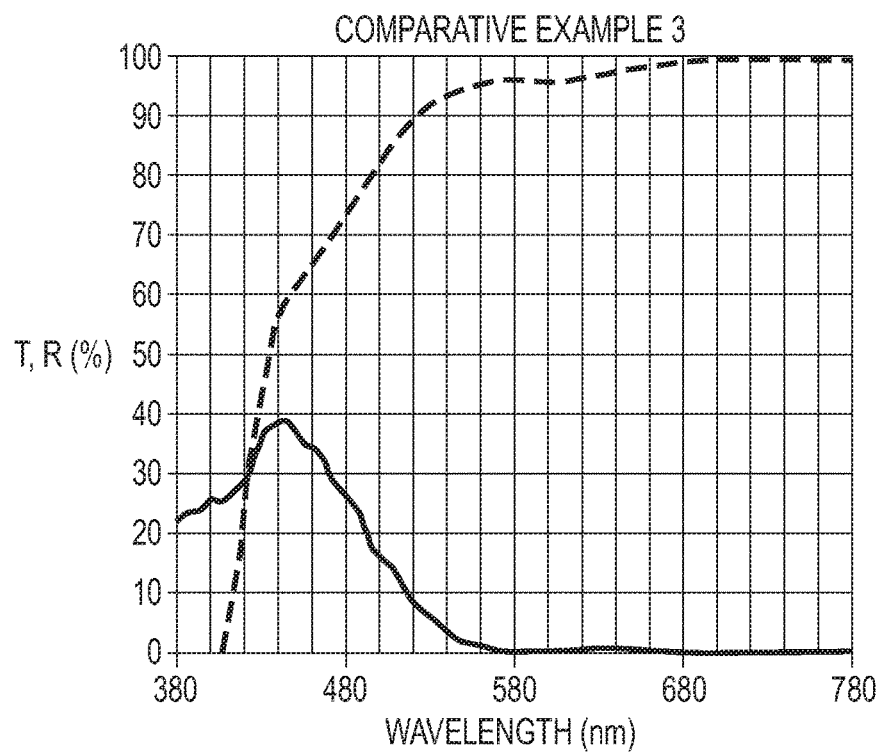
FIG. 7 shows a reflection spectrum and a transmission spectrum of the spectacle lens of Comparative Example 3.

FIG. 7 shows a reflection spectrum and a transmission spectrum of the spectacle lens of Comparative Example 3.

Figure 8:
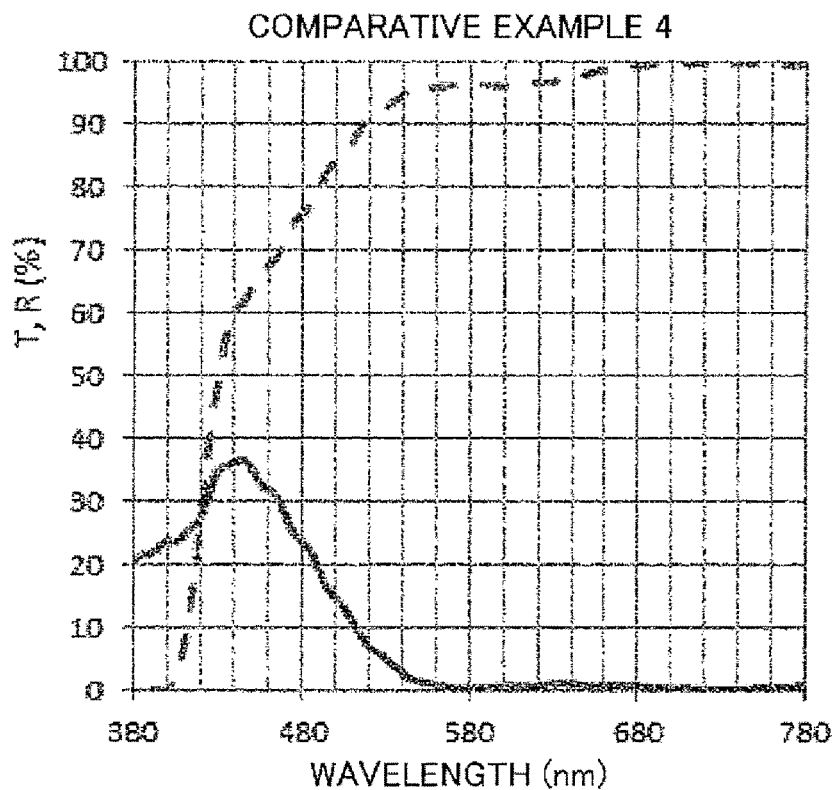
FIG. 8 shows a reflection spectrum and a transmission spectrum of the spectacle lens of Comparative Example 4.

FIG. 8 shows a reflection spectrum and a transmission spectrum of the spectacle lens of Comparative Example 4.

Figure 9:
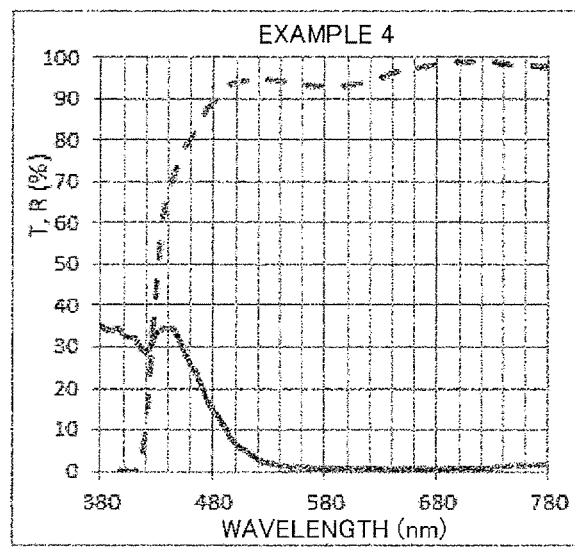
FIG. 9 shows a reflection spectrum and a transmission spectrum of the spectacle lens of Example 4.

FIG. 9 shows a reflection spectrum and a transmission spectrum of the spectacle lens of Example 4.

Figure 10:
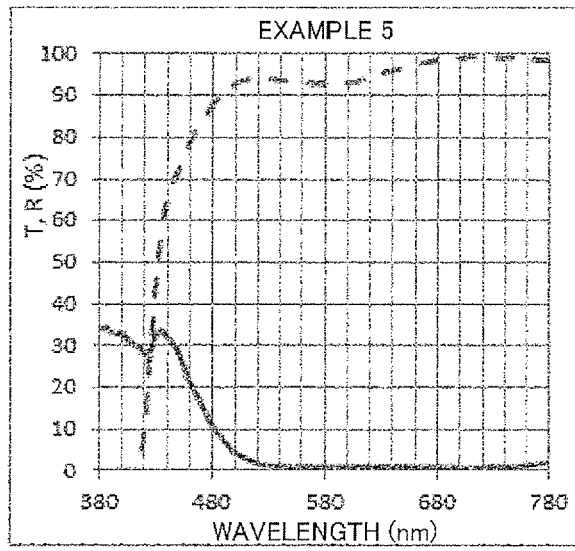
FIG. 10 shows a reflection spectrum and a transmission spectrum of the spectacle lens of Example 5.

FIG. 10 shows a reflection spectrum and a transmission spectrum of the spectacle lens of Example 5.

Figure 11:
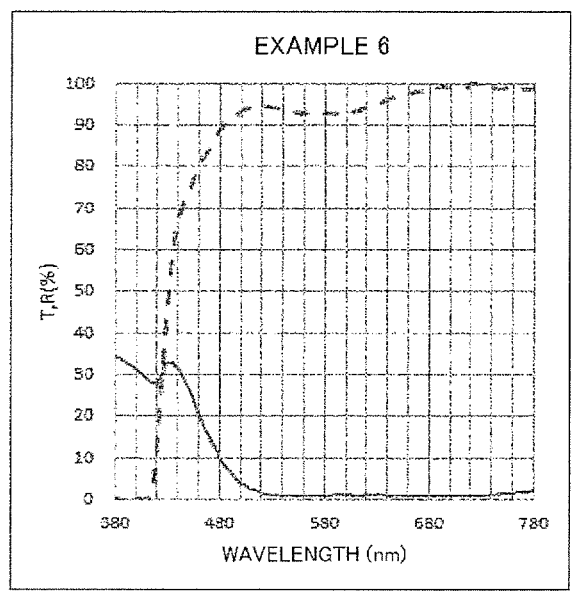
FIG. 11 shows a reflection spectrum and a transmission spectrum of the spectacle lens of Example 6.

FIG. 11 shows a reflection spectrum and a transmission spectrum of the spectacle lens of Example 6.

Figure 12:
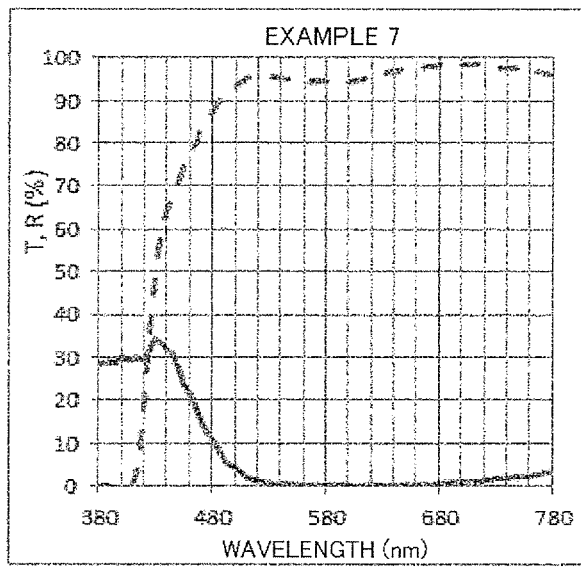
FIG. 12 shows a reflection spectrum and a transmission spectrum of the spectacle lens of Example 7.

FIG. 12 shows a reflection spectrum and a transmission spectrum of the spectacle lens of Example 7.

Figure 13:
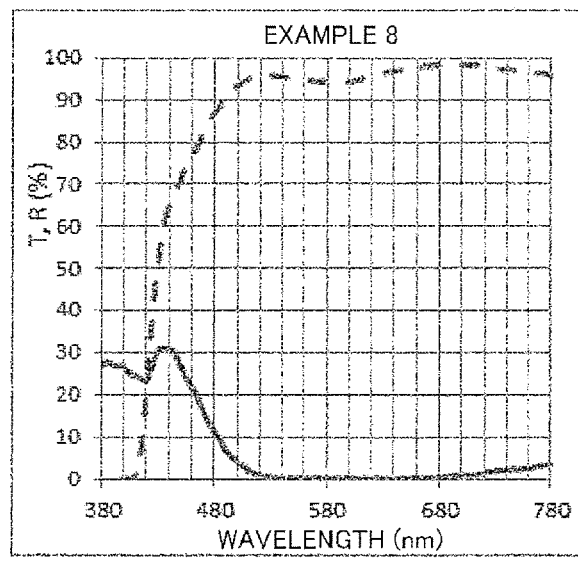
FIG. 13 shows a reflection spectrum and a transmission spectrum of the spectacle lens of Example 8.

FIG. 13 shows a reflection spectrum and a transmission spectrum of the spectacle lens of Example 8.

Figure 14:
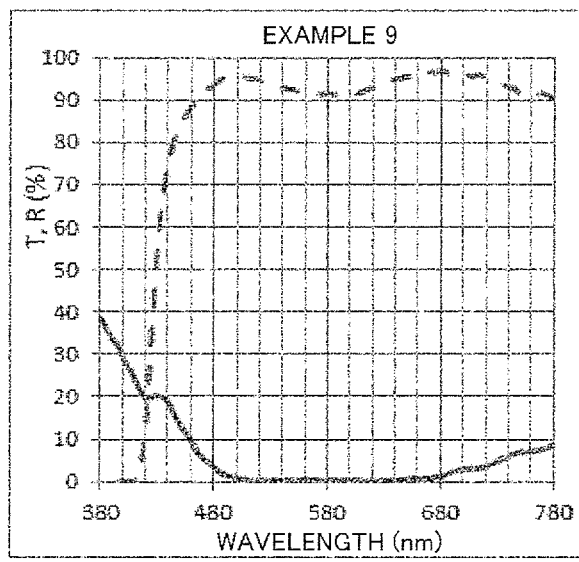
FIG. 14 shows a reflection spectrum and a transmission spectrum of the spectacle lens of Example 9.

FIG. 14 shows a reflection spectrum and a transmission spectrum of the spectacle lens of Example 9.

From the comparison of the reflection spectra and the transmission spectra of Examples, Comparative Examples, and Reference Example shown in the figure, it can be confirmed that the spectacle lenses of Examples have a specific reflection spectral characteristic such that although the reflectance of blue light is high, the reflectance sharply decreases in the wavelength range of green light adjacent to the wavelength range of blue light.

(3) Evaluation of Ghosts

The spectacle lenses of Examples and Comparative Examples were observed from the eyeball side at a position of 30 cm below the fluorescent lamp in a dark room and the presence or absence and degree of occurrence of a ghost (double image) were sensory-evaluated based on the following evaluation criteria.

B: a clear ghost is observed.
A: no clear ghost is observed; a thin ghost is observed.
A+: a thin ghost is observed but milder than A.
A++: a thin ghost is observed, but milder than A+.
A+++: a thin ghost is observed, but milder than A++, or no ghost is observed.

(4) Evaluation of Glare (Object Side)

The spectacle lenses of Examples, Comparative Examples, and Reference Example were observed from the object side in a room with normal brightness, and the intensity of the glare (light reflected by the object-side surface) of the spectacle lenses of Examples and Comparative Examples was sensory-evaluated by the eye of an observer on the basis of the following evaluation criteria.

B: glare is clearly felt as compared with the spectacle lens of Comparative Example 1.
A: glare is not felt or slight glare is felt, but it is milder than B.

(5) Evaluation of Glare (Eyeball Side)

The spectacle lenses of Examples, Comparative Examples, and Reference Example were observed from the eyeball side in a room with normal brightness, and the intensity of the glare (light reflected by the eyeball-side surface) of the spectacle lenses of Examples and Comparative Examples was sensory-evaluated by the eye of an observer on the basis of the following evaluation criteria.

B: glare is clearly felt as compared with the spectacle lens of Comparative Example 1.
A: glare is not felt or slight glare is felt, but it is milder than B.

The above results are shown in Table 2.

TABLE 2

|  |  | Ex. 1 | Ref. Ex. 1 | Comp. Ex. 1 | Ex. 2 | Comp. Ex. 2 | Ex. 3 |
|---|---|---|---|---|---|---|---|
| Visual reflectance | Object side | 1.0% | 0.5% | 1.1% | 1.0% | 1.3% | 1.2% |
|  | Eyeball side | 1.0% | 0.8% | 1.1% | 0.9% | 0.7% | 1.2% |
| Blue light reflectance (average reflectance in 400 nm to 500 nm) | Object side | 18.4% | 3.6% | 18.0% | 16.4% | 16.4% | 18.8% |
|  | Eyeball side | 16.8% | 5.2% | 16.2% | 15.5% | 14.1% | 18.8% |
| Visual transmittance of spectacle lens |  | 92.9% | 94.4% | 97.1% | 93.4% | 97.0% | 96.8% |
| Blue light cut rate of spectacle lens $C_b$ |  | 44.2% | 23.5% | 34.3% | 38.4% | 29.8% | 36.6% |
| Blue light absorbance of spectacle lens $a_b$ |  | 22.0% | 19.2% | 5.5% | 21.0% | 5.5% | 15.6% |
| Ghost evaluation |  | A++ | — | B | A+++ | B | A+ |
| Glare evaluation (object side) |  | A | — | A | A | A | A |
| Glare evaluation (eyeball side) |  | A | — | A | A | A | A |

|  |  | Comp. Ex. 3 | Comp. Ex. 4 | Ex. 4 | Ex. 5 | Ex. 6 | Ex. 7 | Ex. 8 | Ex. 9 |
|---|---|---|---|---|---|---|---|---|---|
| Visual reflectance | Object side | 2.7% | 2.4% | 0.6% | 0.9% | 0.9% | 1.2% | 0.6% | 0.3% |
|  | Eyeball side | 2.7% | 2.4% | 0.6% | 0.6% | 0.6% | 0.6% | 1.0% | 0.4% |
| Blue light reflectance (average reflectance in 400 nm to 500 nm) | Object side | 20.7% | 19.2% | 11.2% | 12.8% | 12.9% | 17.3% | 11.2% | 10.2% |
|  | Eyeball side | 20.7% | 19.2% | 11.3% | 11.2% | 12.3% | 11.3% | 15.3% | 10.1% |
| Visual transmittance of spectacle lens |  | 92.5% | 93.2% | 93.4% | 93.0% | 93.0% | 94.2% | 94.2% | 92.8% |
| Blue light cut rate of spectacle lens $C_b$ |  | 44.0% | 42.1% | 36.2% | 38.2% | 37.0% | 37.2% | 37.1% | 30.3% |
| Blue light absorbance of spectacle lens $a_b$ |  | 22.4% | 21.7% | 18.0% | 23.4% | 22.4% | 22.0% | 22.4% | 22.9% |
| Ghost evaluation |  | B | A | A+++ | A+++ | A+++ | A+++ | A+++ | A+++ |
| Glare evaluation (object side) |  | B | B | A | A | A | A | A | A |
| Glare evaluation (eyeball side) |  | B | B | A | A | A | A | A | A |

From the results shown in Table 2, it can be confirmed that the spectacle lenses of the examples have a blue-light reflectance as high as 10.0% to 20.0% on the object-side surface and the eyeball-side surface, but the occurrence of ghost and glare are suppressed.

Further, it can be confirmed that the spectacle lenses of the examples have a high blue light cut rate, a high luminous transmittance, and excellent transparency.

The above-described embodiments are summarized hereinbelow.

According to one embodiment, there is provided a spectacle lens including a lens substrate, a multilayer film located on an object-side surface of the lens substrate, and a multilayer film located on an eyeball-side surface of the lens substrate, wherein a blue light absorption rate is 10.0% or higher, the lens substrate includes a blue-light-absorbing compound, and an average reflectance in a wavelength range of 400 nm to 500 nm measured on each of the object-side surface and the eyeball-side surface of the spectacle lens is in a range of 10.0% to 20.0%, and a luminous reflectance measured on each of the object-side surface and the eyeball-side surface of the spectacle lens is less than 2.0%.

Although the spectacle lens has a high blue light reflectance on the object-side surface and the eyeball-side surface of the spectacle lens, the occurrence of ghosts and glare can be suppressed. As a result, it is possible to realize a good wearing feeling and appearance.

In one embodiment, the blue light cut rate is 30.0% or more.

In one embodiment, the blue light cut rate is 36.0% or more.

In one embodiment, the luminous reflectance measured on each of the object-side surface and the eyeball-side surface of the spectacle lens is 1.8% or less.

In one embodiment, the average reflectance in a wavelength range of 400 nm to 500 nm measured on each of the object-side surface and the eyeball-side surface of the spectacle lens is in a range of 15.0% to 20.0%.

In one embodiment, the average reflectance in a wavelength range of 400 nm to 500 nm measured on at least one of the object-side surface and the eyeball-side surface of the spectacle lens is greater than 10.0% and 19.0% or less.

In one embodiment, the average reflectance in a wavelength range of 400 nm to 500 nm measured on each of the object-side surface and the eyeball-side surface of the spectacle lens is greater than 10.0% and 19.0% or less.

In one embodiment, the average reflectance in a wavelength range of 400 nm to 500 nm measured on at least one of the object-side surface and the eyeball-side surface of the spectacle lens is greater than 10.0% and 18.0% or less.

In one embodiment, the average reflectance in a wavelength range of 400 nm to 500 nm measured on each of the object-side surface and the eyeball-side surface of the spectacle lens is greater than 10.0% and 18.0% or less.

In one embodiment, the average reflectance in a wavelength range of 400 nm to 500 nm measured on at least one of the object-side surface and the eyeball-side surface of the spectacle lens is greater than 10.0% and 17.5% or less.

In one embodiment, the average reflectance in a wavelength range of 400 nm to 500 nm measured on each of the object-side surface and the eyeball-side surface of the spectacle lens is greater than 10.0% and 17.5% or less.

In one embodiment, the average reflectance in a wavelength range of 400 nm to 500 nm measured on at least one of the object-side surface and the eyeball-side surface of the spectacle lens is greater than 10.0% and 17.0% or less.

In one embodiment, the average reflectance in a wavelength range of 400 nm to 500 nm measured on each of the object-side surface and the eyeball-side surface of the spectacle lens is greater than 10.0% and 17.0% or less.

In one embodiment, the average reflectance in a wavelength range of 400 nm to 500 nm measured on at least one of the object-side surface and the eyeball-side surface of the spectacle lens is greater than 10.0% and 16.0% or less.

In one embodiment, the average reflectance in a wavelength range of 400 nm to 500 nm measured on each of the object-side surface and the eyeball-side surface of the spectacle lens is greater than 10.0% and 16.0% or less.

In one embodiment, the average reflectance in a wavelength range of 400 nm to 500 nm measured on at least one of the object-side surface and the eyeball-side surface of the spectacle lens is greater than 11.0% and 16.0% or less.

In one embodiment, the average reflectance in a wavelength range of 400 nm to 500 nm measured on each of the object-side surface and the eyeball-side surface of the spectacle lens is greater than 11.0% and 16.0% or less.

In one embodiment, the average reflectance in a wavelength range of 400 nm to 500 nm measured on at least one of the object-side surface and the eyeball-side surface of the spectacle lens is greater than 12.0% and 16.0% or less.

In one embodiment, the average reflectance in a wavelength range of 400 nm to 500 nm measured on each of the object-side surface and the eyeball-side surface of the spectacle lens is greater than 12.0% and 16.0% or less.

In one embodiment, the blue-light-absorbing compound is a benzotriazole compound.

In one embodiment, the multilayer film located on the object-side surface of the lens substrate and the multilayer film located on the eyeball-side surface of the lens substrate each have a plurality of coating films including an inorganic material as a main component.

In one embodiment, the multilayer film located on the object-side surface of the lens substrate and the multilayer film located on the eyeball-side surface of the lens substrate each have at least one layered structure in which a coating film including silicon oxide as a main component and a coating film including zirconium oxide as a main component are adjacent to each other.

In one embodiment, the luminous transmittance is 90.0 or more.

According to another embodiment, there are provided spectacles having the abovementioned spectacle lens, and a frame in which the spectacle lens is mounted.

It should be understood that the embodiments disclosed herein are exemplary in all respects and are not restrictive. The scope of the present disclosure is indicated not by the above description but by the claims and is intended to include meanings equivalent to claims and all changes within the scope of the claims.

One aspect of the present disclosure is useful in the fields of manufacturing spectacle lenses and spectacles.

What is claimed is:

1. A spectacle lens comprising: a lens substrate; a multilayer film located on an object-side surface of the lens substrate; and a multilayer film located on an eyeball-side surface of the lens substrate, wherein
a blue light absorption rate is in a range of 10.0% to 30%,
the lens substrate includes a blue-light-absorbing compound,
an average reflectance in a wavelength range of 400 nm to 500 nm measured on each of the object-side surface and the eyeball-side surface of the spectacle lens is in a range of 10.0% to 20.0%, and a luminous reflectance measured on each of the object-side surface and the eyeball-side surface of the spectacle lens is less than 2.0%, and the multilayer film located on the object-side surface of the lens substrate and the multilayer film located on the eyeball-side surface of the lens substrate each have at least one layered structure in which a coating film including silicon oxide as a main component and a coating film including zirconium oxide as a main component are adjacent to each other.

2. The spectacle lens according to claim 1, wherein a blue light cut rate is 30% or more.

3. The spectacle lens according to claim 1, wherein a blue light cut rate is 36% or more.

4. The spectacle lens according to claim 1, wherein the luminous reflectance measured on each of the object-side surface and the eyeball-side surface of the spectacle lens is 1.8% or less.

5. The spectacle lens according to claim 1, wherein the average reflectance in a wavelength range of 400 nm to 500 nm measured on each of the object-side surface and the eyeball-side surface of the spectacle lens is in a range of 15.0% to 20.0%.

6. The spectacle lens according to claim 1, wherein the average reflectance in a wavelength range of 400 nm to 500 nm measured on at least one of the object-side surface and the eyeball-side surface of the spectacle lens is less than or equal to 16.0% but greater than 10.0%.

7. The spectacle lens according to claim 6, wherein the average reflectance in a wavelength range of 400 nm to 500 nm measured on each of the object-side surface and the eyeball-side surface of the spectacle lens is less than or equal to 16.0% but greater than 10.0%.

8. The spectacle lens according to claim 1, wherein the blue-light-absorbing compound is a benzotriazole compound.

9. The spectacle lens according to claim 1, wherein the at least one layered structure of the multilayer film located on the object-side surface of the lens substrate and the at least one layered structure of the multilayer film located on the eyeball-side surface of the lens substrate each have a plurality of coating films including silicon oxide as a main component and a plurality of coating films including zirconium oxide as a main component.

10. The spectacle lens according to claim 1, wherein a luminous transmittance is 90.0% or more.

11. Spectacles comprising: the spectacle lens according to claim 1; and a frame in which the spectacle lens is mounted.

* * * * *